(12) United States Patent
Tylik et al.

(10) Patent No.: US 10,268,419 B1
(45) Date of Patent: Apr. 23, 2019

(54) QUALITY OF SERVICE FOR STORAGE SYSTEM RESOURCES

(71) Applicant: EMC IP Holding Company LLC, Hopkinton, MA (US)

(72) Inventors: Dmitry Nikolayevich Tylik, Westborough, MA (US); Kenneth Hu, Lexington, MA (US); Qi Jin, Sudbury, MA (US); William Whitney, Marlborough, MA (US); Karl M. Owen, Chapel Hill, NC (US)

(73) Assignee: EMC IP Holding Company LLC, Hopkinton, MA (US)

( * ) Notice: Subject to any disclaimer, the term of this patent is extended or adjusted under 35 U.S.C. 154(b) by 97 days.

(21) Appl. No.: 15/499,334

(22) Filed: Apr. 27, 2017

(51) Int. Cl.
*G06F 3/06* (2006.01)

(52) U.S. Cl.
CPC ............ *G06F 3/0659* (2013.01); *G06F 3/067* (2013.01); *G06F 3/0613* (2013.01)

(58) Field of Classification Search
CPC ...... G06F 3/067; G06F 3/0659; G06F 3/0685; G06F 3/0664; G06F 3/061; G06F 2209/503; G06F 3/0617; G06F 2209/5013; G06F 2209/504; G06F 2209/5022; G06F 9/4881; G06F 9/5005
See application file for complete search history.

(56) References Cited

U.S. PATENT DOCUMENTS

| 9,465,550 | B1 | 10/2016 | Lippitt et al. |
| 9,537,777 | B1 | 1/2017 | Tohmaz et al. |
| 9,703,602 | B1 * | 7/2017 | Kusters ............ G06F 9/5011 |
| 2011/0010427 | A1 * | 1/2011 | Jnagal ............ G06F 3/0605 709/213 |

* cited by examiner

*Primary Examiner* — Reginald G Bragdon
*Assistant Examiner* — Thanh D Vo
(74) *Attorney, Agent, or Firm* — Muirhead and Saturnelli, LLC

(57) ABSTRACT

A hierarchy of multiple levels of storage resources and associated QOS (quality of service) limits and buckets of tokens may be specified. A different QOS limit may be applied to each individual storage resource. The buckets may denote current amounts of tokens available for consumption in connection with servicing I/O operations. Each bucket may denote a current amount of available tokens for a corresponding storage resource of included in the hierarchy. Processing may include receiving a first I/O operation directed to a first storage resource, and determining, in accordance with the buckets of available tokens, whether to service the first I/O operation.

16 Claims, 15 Drawing Sheets

Capability profile 310

310a  Flash= Yes

310b  Drive type=EFD, SAS, NL-SAS, SATA

310c  RAID type=RAID-5, RAID-6, RAID-10

310d  QOS limit = 20,000 KBs/second

310f  Logical device types= thick, thin

QUALITY OF SERVICE FOR STORAGE SYSTEM RESOURCES

BACKGROUND

Technical Field

This application generally relates to data storage and, more particularly, techniques for controlling consumption of storage system resources.

Description of Related Art

Computer systems may include different resources used by one or more host processors. Resources and host processors in a computer system may be interconnected by one or more communication connections. These resources may include, for example, data storage devices such as those included in the data storage systems manufactured by Dell Inc. These data storage systems may be coupled to one or more host processors and provide storage services to each host processor. Multiple data storage systems from one or more different vendors may be connected and may provide common data storage for one or more host processors in a computer system.

A host may perform a variety of data processing tasks and operations using the data storage system. For example, a host may perform basic system I/O (input/output) operations in connection with data requests, such as data read and write operations.

Host systems may store and retrieve data using a data storage system containing a plurality of host interface units, disk drives (or more generally storage devices), and disk interface units. Such data storage systems are provided, for example, by Dell Inc. The host systems access the storage devices through a plurality of channels provided therewith. Host systems provide data and access control information through the channels to a storage device of the data storage system and data of the storage device is also provided from the data storage system to the host systems also through the channels. The host systems do not address the disk drives of the data storage system directly, but rather, access what appears to the host systems as a plurality of logical units, logical devices or logical volumes. The logical units may or may not correspond to the actual physical drives. Allowing multiple host systems to access the single data storage system allows the host systems to share data stored therein.

SUMMARY OF THE INVENTION

In accordance with one aspect of techniques herein is a method of processing I/O (input/output) operations comprising: receiving a first I/O operation directed to a first storage resource, said first storage resource being included in a storage resource hierarchy comprising a plurality of levels of storage resources, wherein a plurality of buckets denote current amounts of tokens available for consumption in connection with servicing I/O operations, each of the plurality of buckets denoting a current amount of available tokens for a corresponding one of the storage resources included in the storage resource hierarchy; and determining, in accordance with the plurality of buckets of available tokens for the plurality of levels of storage resources, whether to service the first I/O operation. A first of the plurality of buckets may denote the current amount of available tokens for the first storage resource and a second of the plurality of buckets may denote the current amount of available tokens for a second storage resource. Servicing the first I/O operation may include consuming a first amount of available tokens of the first resource bucket; and consuming a second amount of available tokens of the second bucket. Determining whether to service the first I/O operation may include: determining whether there is at least one available token in each of the first bucket and the second bucket; and if it is determined that there is at least one available token in each of the first bucket and the second bucket, performing first processing to service the first I/O operation, said first processing including: decrementing the current amount of available tokens in the first bucket by the first amount; and decrementing the current amount of available tokens in the second bucket by the second amount. Determining whether to service the first I/O operation may include if it is determined that there is not at least one available token in each of the first bucket and the second bucket, determining not to service the first I/O operation and placing the first I/O operation in a queue of pending I/O operations to be serviced at a later point in time. The first I/O operation may be serviced at a later point in time when there is at least one available token in each of the first bucket and the second bucket. Determining whether to service the first I/O operation may include: determining whether the current amount of available tokens in the first bucket is at least the first amount and whether the current amount of available tokens in the second bucket is at least the second amount; and if it is determined that the current amount of available tokens in the first bucket is at least the first amount and that the current amount of available tokens in the second bucket is at least the second amount, performing first processing to service the first I/O operation, said first processing including: decrementing the current amount of available tokens in the first bucket by the first amount; and decrementing the current amount of available tokens in the second bucket by the second amount. Determining whether to service the first I/O operation may include: if it is determined that the current amount of available tokens in the first bucket is not at least the first amount or that the current amount of available tokens in the second bucket is not at least the second amount, determining not to service the first I/O operation and placing the first I/O operation in a queue of pending I/O operations to be serviced at a later point in time. The first I/O operation may be serviced at a later point in time when the current amount of available tokens in the first bucket is at least the first amount and the current amount of available tokens in the second bucket is at least the second amount. The first storage resource and the second storage resource may be located in the storage resource hierarchy and wherein the second storage resource may be located at a higher level in the storage resource hierarchy than the first storage resource. The first storage resource may be a virtual volume and the second storage resource may be a storage container. The first storage resource may be a logical device or a file system, and the second storage resource may be any of a storage pool or a RAID group. The first storage resource may be configured within, or using an allocated amount of, the second storage resource. Each available token in the first bucket and the second bucket may represent any of: a single I/O operation, and a unit of storage read or written in connection with I/O operations. The first I/O operation may include any of: reading data from the first storage resource, and writing data to the first storage resource. The method may include: receiving a plurality of maximum limits for the plurality of levels of storage resources, wherein each of the plurality of maximum limits specifies a maximum consumption amount in a specified time period for a corresponding storage resource of the storage resource hierarchy; and periodically incrementing the current amounts of available tokens of the plurality of buckets in accordance with the plurality of maximum limits. The storage resource hierarchy may include at least three levels, wherein a third of the plurality of buckets may denote the current amount of available tokens for a third storage resource. Servicing the first I/O operation may comprise: consuming a third amount of available tokens of the third resource bucket. The first storage resource, the second storage resource, and the third storage resource may be located in the storage resource hierarchy. The second storage resource may be located at a higher level in the storage resource hierarchy than the first storage resource. The third storage resource may be located at a higher level in the storage resource hierarchy than second storage resource. The first storage resource may be configured using an allocated amount of the second storage resource, and the second storage resource may be configured using an allocated amount of the third storage resource.

In accordance with another aspect of techniques herein is a system comprising: a processor; and a memory comprising code stored therein that, when executed by the processor, performs a method of processing I/O (input/output) operations comprising: receiving a first I/O operation directed to a first storage resource, said first storage resource being included in a storage resource hierarchy comprising a plurality of levels of storage resources, wherein a plurality of buckets denote current amounts of tokens available for consumption in connection with servicing I/O operations, each of the plurality of buckets denoting a current amount of available tokens for a corresponding one of the storage resources included in the storage resource hierarchy; and determining, in accordance with the plurality of buckets of available tokens for the plurality of levels of storage resources, whether to service the first I/O operation.

In accordance with another aspect of techniques herein is a computer readable medium comprising code stored thereon that, when executed, performs a method of processing I/O (input/output) operations comprising: receiving a first I/O operation directed to a first storage resource, said first storage resource being included in a storage resource hierarchy comprising a plurality of levels of storage resources, wherein a plurality of buckets denote current amounts of tokens available for consumption in connection with servicing I/O operations, each of the plurality of buckets denoting a current amount of available tokens for a corresponding one of the storage resources included in the storage resource hierarchy; and determining, in accordance with the plurality of buckets of available tokens for the plurality of levels of storage resources, whether to service the first I/O operation. A first of the plurality of buckets may denote the current amount of available tokens for the first storage resource and a second of the plurality of buckets may denote the current amount of available tokens for a second storage resource/. Servicing the first I/O operation may include: consuming a first amount of available tokens of the first resource bucket; and consuming a second amount of available tokens of the second bucket.

BRIEF DESCRIPTION OF THE DRAWINGS

Features and advantages of the present invention will become more apparent from the following detailed description of exemplary embodiments thereof taken in conjunction with the accompanying drawings in which:

FIGS. 4, 5 and 6 are examples illustrating storage capability profiles and storage policy profiles in an embodiment in accordance with techniques herein;

DETAILED DESCRIPTION OF EMBODIMENT(S)

Figure 1:
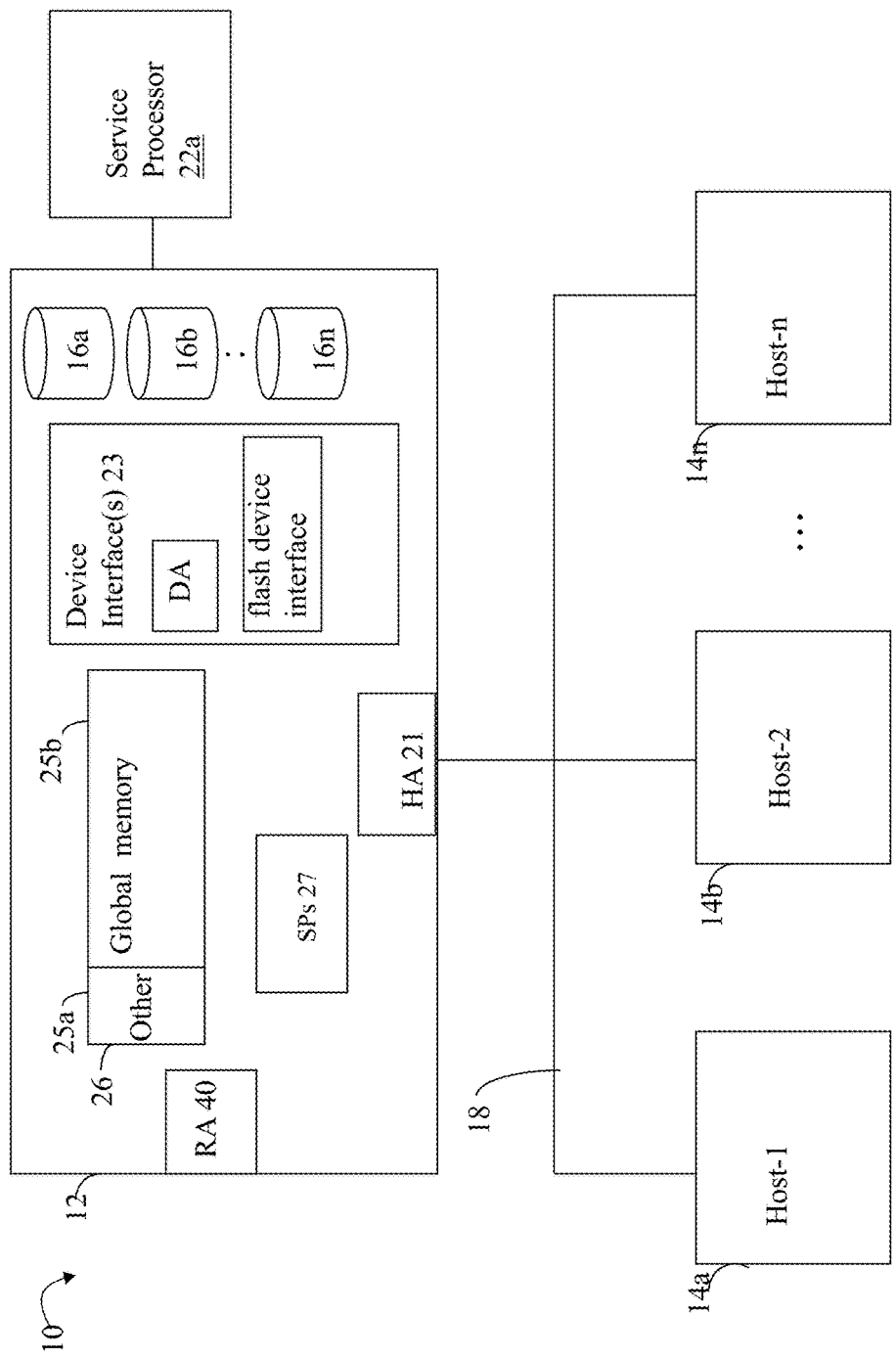
FIG. 1 is an example of an embodiment of a system that may utilize the techniques described herein.

Referring to FIG. 1, shown is an example of an embodiment of a system that may be used in connection with performing the techniques described herein. The system 10 includes a data storage system 12 connected to host systems 14a-14n through communication medium 18. In this embodiment of the computer system 10, and the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as SCSI, Fibre Channel, iSCSI, and the like. Some or all of the connections by which the hosts and data storage system may be connected to the communication medium may pass through other communication devices, such switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by Dell Inc. However, as will be appreciated by those skilled in the art, the techniques herein are applicable for use with other data storage arrays by other vendors and with other components than as described herein for purposes of example.

The data storage system 12 may be a data storage array including a plurality of data storage devices 16a-16n. The data storage devices 16a-16n may include one or more types of data storage devices such as, for example, one or more rotating disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory-based SSDs are one type of SSD that contains no moving parts. As described in more detail in following paragraphs, the techniques herein may be used in an embodiment in which one or more of the devices 16a-16n are flash drives or devices. More generally, the techniques herein may also be used with any type of SSD although following paragraphs may make reference to a particular type such as a flash device or flash memory device.

The data storage array may also include different types of adapters or directors, such as an HA 21 (host adapter), RA 40 (remote adapter), and/or device interface 23. Each of the adapters may be implemented using hardware including a processor with local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from the host. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers), adapters used to interface with the flash drives, and the like. The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, HAs and/or RAs in a data storage array. In one embodiment, the device interfaces 23 may perform data operations using a cache that may be included in the global memory 25b, for example, when communicating with other device interfaces and other components of the data storage array. The other portion 25a is that portion of memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the drives or devices 16a-16n of the storage systems directly, but rather access to data may be provided to one or more host systems from what the host systems view as a plurality of logical devices, logical volumes (LVs) which may also referred to herein as logical units (e.g., LUNs). A logical unit (LUN) may be characterized as a disk array or data storage system reference to an amount of disk space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives or more generally physical storage devices. For example, one or more LUNs may reside on a single physical disk drive, data of a single LUN may reside on multiple different physical devices, and the like. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LUN (s) residing thereon. A flash device interface may be another type of device interface used in connection with facilitating data transfers to/from the associated flash devices and LUN(s) residing thereon. It should be noted that an embodiment may use the same or a different device interface for one or more different types of devices than as described herein.

In an embodiment in accordance with techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

The device interface, such as a DA, performs I/O operations on a physical device or drive 16a-16n. In the following description, data residing on a LUN may be accessed by the device interface following a data request in connection with I/O operations that other directors originate. For example, a host may issue an I/O operation which is received by the HA 21. The I/O operation may identify a target location from which data is read from, or written to, depending on whether the I/O operation is, respectively, a read or a write operation request. The target location of the received I/O operation may be expressed in terms of a LUN and logical address or offset location (e.g., LBA or logical block address) on the LUN. Processing may be performed on the data storage system to further map the target location of the received I/O operation, expressed in terms of a LUN and logical address or offset location on the LUN, to its corresponding physical device (PD) and location on the PD. The DA which services the particular PD may further perform processing to either read data from, or write data to, the corresponding physical device location for the I/O operation.

Also shown in FIG. 1 is a service processor 22a that may be used to manage and monitor the system 12. In one embodiment, the service processor 22a may be used in collecting performance data, for example, regarding the I/O performance in connection with data storage system 12. This performance data may relate to, for example, performance measurements in connection with a data request as may be made from the different host computer systems 14a 14n. This performance data may be gathered and stored in a storage area. Alternatively, an embodiment may provide for collection of such performance data using processor(s) and other components which are internal to the data storage system.

It should be noted that a service processor 22a may exist external to the data storage system 12 and may communicate with the data storage system 12 using any one of a variety of communication connections. In one embodiment, the service processor 22a may communicate with the data storage system 12 through three different connections, a serial port, a parallel port and using a network interface card, for example, with an Ethernet connection. Using the Ethernet connection, for example, a service processor may communicate directly with DAs and HAs within the data storage system 12.

It should be noted that each of the different adapters, such as HA21, DA or disk interface, RA, and the like, may be implemented as a hardware component including, for example, one or more processors, one or more forms of memory, and the like. Code may be stored in one or more of the memories of the component for performing processing.

Figure 2:
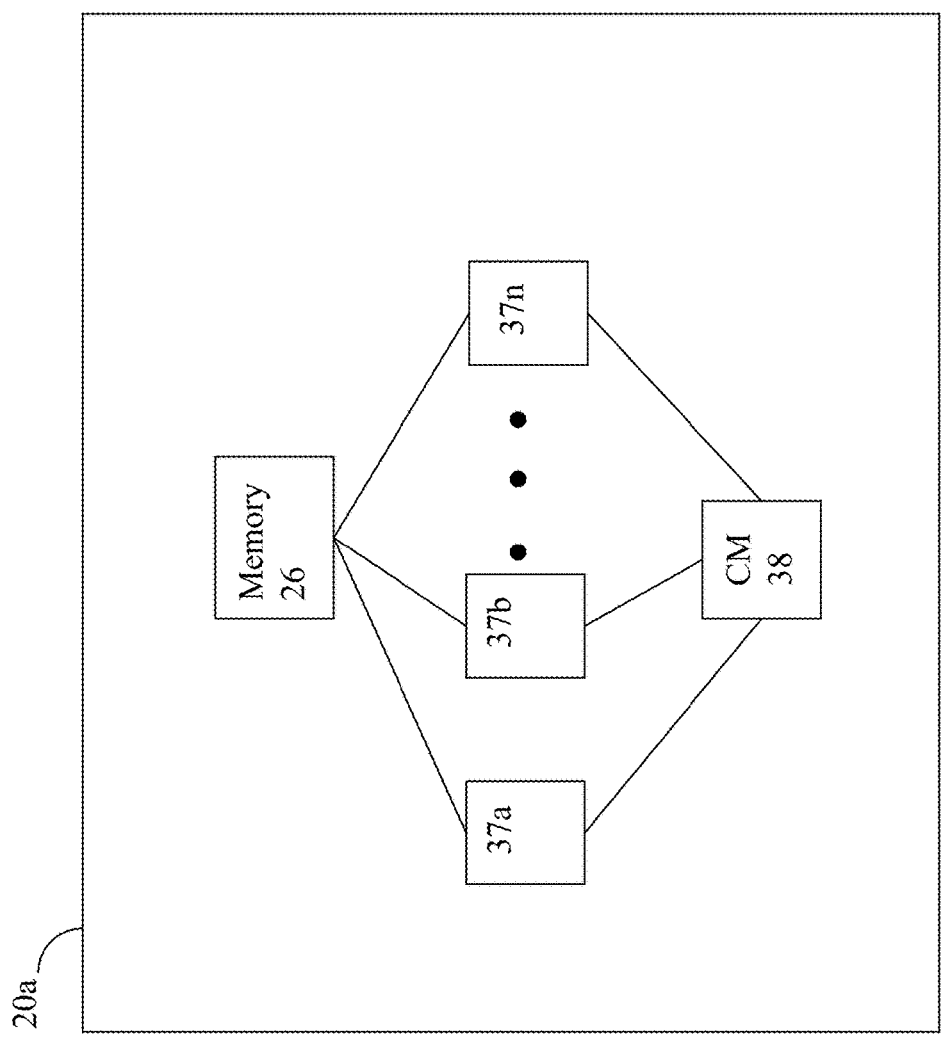
FIG. 2 is a representation of the logical internal communications between the directors and memory in an embodiment of a data storage system in accordance with techniques herein.

Referring to FIG. 2, shown is a representation of the logical internal communications between the directors and memory included in a data storage system. Included in FIG. 2 is a plurality of directors 37a-37n coupled to the memory 26. Each of the directors 37a-37n represents one of the HAs, RAs, or device interfaces that may be included in a data storage system. In an embodiment disclosed herein, there may be up to sixteen directors coupled to the memory 26. Other embodiments may allow a maximum number of directors other than sixteen as just described and the maximum number may vary with embodiment.

The representation of FIG. 2 also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

With reference back to FIG. 1, components of the data storage system may communicate using GM 25b. In connection with performing I/O operations, such as writes as well as reads, a data storage system in an embodiment in accordance with techniques herein may use a cache in order to improve performance. For example, in connection with a write operation, an embodiment may first store the data in cache included in a portion of GM 25b, mark the cache slot including the write operation data as write pending (WP), and then later de-stage the WP data from cache to one of the devices 16a-16n. In connection with returning data to a host from one of the devices as part of a read operation, the data may be copied from the device by the appropriate device interface, such as a DA servicing the device. The device interface may copy the data read into a cache slot included in GM which is, in turn, communicated to the appropriate HA in communication with the host.

It should be noted that an embodiment of a data storage system may include components having different names from that described herein but which perform functions similar to components as described herein. Additionally, components within a single data storage system, and also between data storage systems, may communicate using any suitable technique that may differ from that as described herein for exemplary purposes. For example, element 12 of FIG. 1 may be a data storage system that includes multiple storage processors (SPs). Each of the SPs 27 may be a CPU including one or more "cores" or processors and each may have their own memory used for communication between the different front end and back end components rather than utilize a global memory accessible to all storage processors. In such embodiments, memory 26 may represent memory of each such storage processor.

It should be noted that the techniques herein may be used in connection with flash devices comprising what may be characterized as enterprise-grade or enterprise-class flash drives (EFDs) with an expected lifetime (e.g., as measured in an amount of actual elapsed time such as a number of years, months, and/or days) based on a number of guaranteed write cycles, or program cycles, and a rate or frequency at which the writes are performed. In the foregoing data storage array, the data storage devices 16a-16n may include a combination of disk devices and flash devices in which the flash devices may appear as standard Fibre Channel (FC) drives to the various software tools used in connection with the data storage array.

Generally, LUNs as described herein may be characterized as a block-based logical device provided in connection with block-based data services and protocols of the data storage system (e.g., SCSI and iSCSI as noted elsewhere herein). More generally, the data storage system 12 may provide many different types of data services as an alternative to, or in addition to, block-based data services. For example, the data services may include file-based data services based on one or more file systems and associated protocols, such as NFS (Network File System), CIFS (Common Internet File System), and the like, known in the art.

The data storage environment for the data storage system 12 may define multiple storage tiers in which each tier includes physical devices or drives of varying technologies. The physical devices of a data storage system, such as a data storage array, may be used to store data for multiple applications. An embodiment in accordance with techniques herein may have one or more defined storage tiers. Each tier may generally include physical storage devices or drives having one or more attributes associated with a definition for that tier. For example, one embodiment may provide a tier definition based on a set of one or more attributes. The attributes may include any one or more of a storage type or storage technology, a type of data protection, device performance characteristic(s), storage capacity, and the like. The storage type or technology may specify whether a physical storage device is an SSD (solid state drive such as a flash drive), a particular type of SSD drive (such using flash or a form of RAM), a type of magnetic rotating disk drive or other non-SSD drive (such as an FC disk drive, a SATA (Serial Advanced Technology Attachment) drive, SAS, NL-SAS), and the like. Data protection may specify a type or level of data storage protection such, for example, as a particular RAID (redundant array of independent disks) level (e.g., RAID1, RAID-5 3+1, RAIDS 7+1, and the like). Performance characteristics may relate to different performance aspects of the physical storage devices of a particular type or technology. For example, there may be multiple types of FC disk drives based on the RPM characteristics of the FC disk drives (e.g., 10K RPM FC drives and 15K RPM FC drives) and FC disk drives having different RPM characteristics may be included in different storage tiers. Storage capacity may specify the amount of data, such as in bytes, that may be stored on the drives. An embodiment may allow a user to define one or more such storage tiers. For example, an embodiment in accordance with techniques herein may define two storage tiers including a first tier of all SSD drives and a second tier of all non-SSD drives.

A RAID group and various RAID configurations are known in the art. A RAID group configuration uses multiple physical devices to provide a combination of fault tolerance and/or improved performance for data storage devices. For example, a RAID-5 group includes multiple PDs and provides protection from a single PD failure with block level striping and distributed parity information, and RAID-6 provides protection from two PDS of the RAID group failing with two sets of distributed parity and block level striping. The particular RAID levels described herein are merely exemplary and not a limitation of the techniques described herein.

Techniques herein may be used in an embodiment having thin or virtually provisioned logical devices. A thin device is a type of logical device where units of storage are progressively allocated on an as-needed basis, such as when there is a first write to a particular logical address range portion of a logical device. Typically, the base units of storage are provisioned from multiple sets of PDs organized as RAID groups, where these groups are partitioned into small portions sometimes referred to as slices. There is a mapping provided to relate the logical address in a thin device to the particular slice of provisioned storage. In a system using thin provisioning, the thin devices may appear to a host coupled to a data storage array as one or more logical volumes (logical devices) containing contiguous blocks of data storage. A thin device may be virtually provisioned in terms of its allocated physical storage where physical storage for a thin device (presented to a host as having a particular capacity) is allocated as needed rather than allocate physical storage for the entire thin device capacity upon creation of the thin device. As such, a thin device presented to the host as having a capacity with a corresponding LBA (logical block address) range may have portions of the LBA range for which storage is not allocated. In some embodiments, storage associated with a particular subrange of the logical address space of a thin device (where the subrange may be the size of a slice or chunk allocation unit) may be initially allocated in response to the first time there is write to the logical address subrange. Thin devices and thin provisioning are described in more detail in U.S. patent application Ser. No. 11/726,831, filed Mar. 23, 2007 (U.S. Patent App. Pub. No. 2009/0070541 A1), AUTOMATED INFORMATION LIFE-CYCLE MANAGEMENT WITH THIN PROVISIONING, Yochai, EMS-147US, and U.S. Pat. No. 7,949,637, Issued May 24, 2011, Storage Management for Fine Grained Tiered Storage with Thin Provisioning, to Burke, both of which are incorporated by reference herein.

An embodiment in accordance with techniques herein may provide for logical devices that are thin or virtually provisioned devices along with thick logical devices. A thick device may be characterized as a regular logical device presented as having a particular storage capacity where physical storage is provisioned (allocated or bound) for the entire storage capacity when the thick device is configured.

In one embodiment in accordance with techniques herein, virtual machines (VMs) may execute in a virtualized environment where the VMs may access and use data stored on logical devices also referred to herein as virtual volumes or VVOLs. For example, an embodiment may have one or more VMs executing on a single physical machine in a virtualized environment using virtualization software, such as vSphere™ from VMware, Inc. In the context of each VM, one or more applications may be executed, where the applications may include any one or more of, for example, an email server application such as Microsoft Exchange Server (MES), a web server, or a database server application. The VMs may execute, for example, on one or more hosts. Each VM may access and use data stored on one or more virtual volumes having physical storage provisioned on a data storage system.

Figure 3:
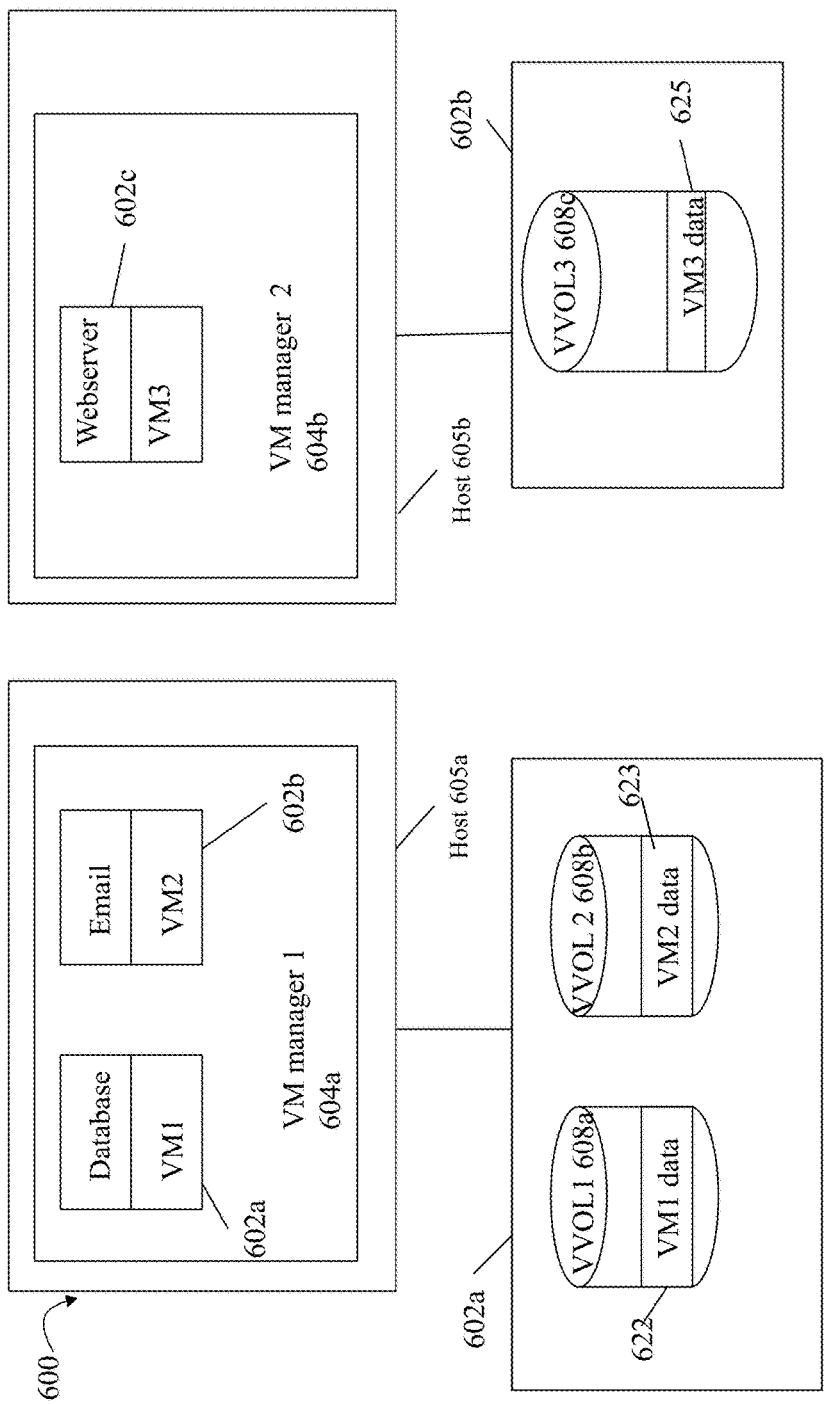
FIG. 3 is an example of data storage systems and hosts including virtual machines in an embodiment in accordance with techniques herein.

Referring to FIG. 3, shown is an example 600 that includes VM 1 602a and VM2 602b managed by VM manager 1 604a and VM3 602c managed by VM manager 2 604b. Each of 604a, 604b may be a hypervisor that performs VM management in connection with multiple VMs such as VMware ESX Server. Such a hypervisor may be installed and run directly on server hardware without requiring an underlying operating system. Each of the VM managers 604a, 604b may perform management of the underlying server's physical resources for use among the multiple VMs that can run simultaneously. In this example, a database application is executed by VM1 602a, an email application is executed by VM2 602b and a webserver is executed by VM3 602c. VM manager 1 604a may execute on a first host 605a and VM manager 2 604b may execute on a second host 605b. Elements 602a, 602b may each be a data storage system. Data storage system 602a may include physical storage provisioned for use with VVOLs 1 and 2 (virtual volumes 1 and 2) 608a, 608b. Data storage system 602b may include physical storage provisioned for use with VVOL3 608c. VMs 602a-b of host 605a may access and use data stored on VVOL 1 608a and VVOL2 608b. VM 602c of host 605b may access and use data stored on VVOL 3 608c.

Data used by a VM that is stored on a VVOL may include data used by the particular application executing on the VM (e.g., database data and log files for a database application executing on a VM such as VM 1 602a) as well as VM metadata regarding its state, configuration, and execution context such as, for example, data stored in memory, CPU registers, swap files, log files, and the like.

VVOLs may be provisioned from a storage container (described below in more detail) by a data storage administrator, such as a virtualization administrator. At least one embodiment in accordance with techniques herein may provide for policy based provisioning of physical storage for VVOLs. More generally, policy based provisioning may be used for any suitable data storage system resource, such as for other logical devices, used by any suitable consumer of data storage system resources. In one embodiment, techniques described in following paragraphs may be embodied in an application programming interface (API) whereby one or more API calls may be made as requests to the data storage system to provision storage for a VVOL, or more generally, logical device such as used in a virtualized environment by a virtual machine (VM).

It should be noted that although embodiments described herein may refer to VMWare and its virtualization environment, more generally, techniques herein for policy based provisioning may be extended for use with other virtualization environments of any suitable vendor. Even more generally as noted above, techniques herein for policy based provisioning may be used in connection with other suitable environments to provision physical storage and other data storage system resources for a logical device.

As mentioned above, a virtualization environment vendor, such as VMware, may allow data storage system vendors to integrate with the virtualization environment by providing an API used to configure and provision physical storage for a VVOL (which is a particular type of logical device used by a VM). Using the API, a request may be issued with parameters to create a VVOL and provision storage for the VVOL. Such parameters may specify different requested options for one or more VVOLs being created. Such options may include, for example, the type of PD or storage tier from which storage is provisioned for the VVOL, the RAID configuration and/or level (e.g., RAID-5, RAID-6, RAID-1, RAID-10), whether the VVOL can be a thick or thin logical device, a QOS (Quality of Service) limit, and the like. The foregoing are described in more detail below. In an embodiment described herein, the foregoing parameters, also referred to as capabilities described elsewhere herein, may be specified in a storage policy profile, also referred to as a policy profile. The policy profile may be included, along with other information, in the API call that is a request to provision storage for a VVOL. Thus, a policy profile may generally specify capabilities of storage system resources that are requested for use with provisioning storage for the requested VVOL.

In an embodiment in accordance with techniques herein, a storage capability profile, also referred to as a capability profile, may be used to express the capabilities of an available or consumable resource of the data storage system whereby such capabilities are exposed or available for use when configuring and provisioning storage for a VVOL, such as using the API with a policy profile as described herein.

The capability profile and policy profile may be expressed using capabilities and constraints associated with the capabilities. A capability may be characterized as a parameter of a storage system configuration such as Drive Type (e.g., NL-SAS, SAS, etc.), RAID Type (e.g., RAID-10, RAID-5, RAID-6 etc.), service level such as a QOS limit (e.g., average latency, amount of data read and/or written per unit of time, I/Os per second or unit of time), and the like. As noted above, a capability may include a QOS limit denoting a maximum control limit, such as a maximum rate of usage or consumption, whereby the QOS limit may be expressed in any suitable manner such as I/O operations per second, amount of data read or written per second (e.g., KBs (kilobytes) per second), and the like. The QOS limit may be used to place controls, limits or bounds in terms of resource allowable for consumption such as per specified unit of time.

Capability metadata may be characterized as a set of capabilities supported by a storage system along with sets or ranges of supported values for each capability. A constraint may be a set or range of values supported or requested for a particular capability for a particular storage system configuration. Thus, generally, a capability profile identifies the various storage resource configurations and options of resources available for provisioning storage (e.g., capabilities and constraints of resources available for provisioning storage), and the policy profile identifies requested storage resource configurations and options of resources when provisioning storage (e.g., capabilities and constraints of resources requested when consuming or provisioning storage). The foregoing profiles, capabilities, and associated values, and examples thereof, are described in more detail in following paragraphs.

As described above, a capability profile may be a set of capabilities along with associated constraints configured by the storage administrator to express supported configuration(s) that may be used to provision storage resources such as for virtualization environments. A policy profile may be a set of capabilities along with associated constraints configured by the virtualization administrator to request required configuration(s) for provisioning of storage resources (e.g. for objects of virtualization environments (e.g. VMs). An embodiment may define and use multiple policy profiles each of which specify different requirements for different uses or applications for which VVOLs may be created.

Figure 4:
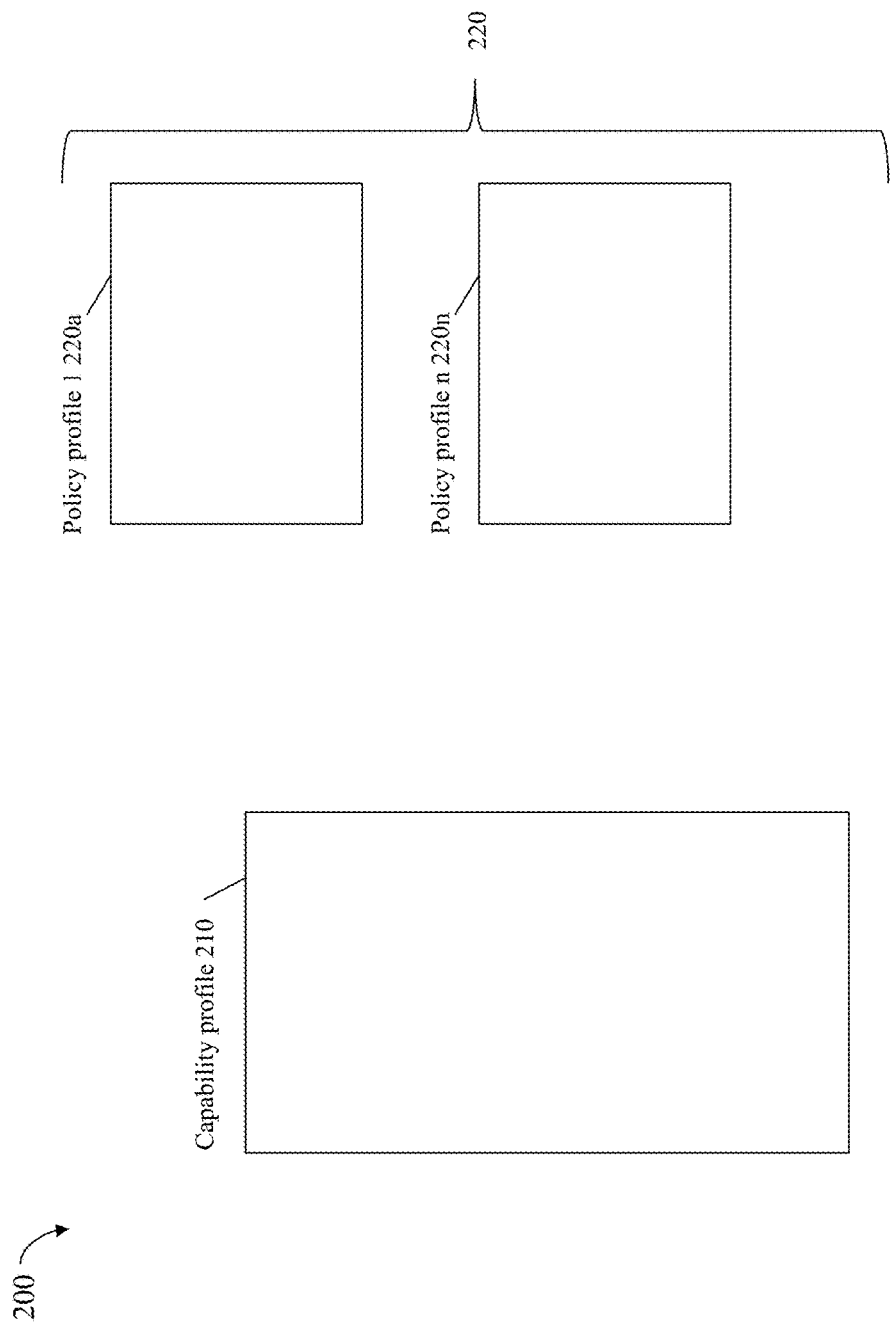

Referring to FIG. 4, shown is an example illustrating profiles that may be used in an embodiment in accordance with techniques herein. The example 200 includes a capability profile 210 that may identify the capabilities and constraints for a data storage system resource, such as a storage pool or storage container, available for consumption. Also, the example 200 includes one or more policy profiles 220 each of which specify different requested capabilities and constraints. For example, a first policy profile 220a may be used to specify requirements or requested storage resource options when creating a first set of one or more VVOLs used by a first application. For example, the first application may need a large amount/capacity of cost efficient storage and performance may not be important. Thus, the first policy profile may specify a lowest performance storage tier, such as SATA rotating disk drives. Additionally, since performance is not important, the first policy profile may indicate that thin provisioning is allowed (since thin provisioned devices incur a performance penalty when storage is allocated in response to a first write to a particular LBA) and a RAID type, such as RAID-6, may be used (e.g., RAID-6 incurs performance penalties for I/O operations thereby typically having lower performance than RAID-5 or RAID-1). The first policy profile 220*a* may also include a first QOS limit, such as 500 I/Os per second, 500 KBs/second, and the like.

A second different policy profile 220*n* may be used to specify requirements or requested storage resource options when creating a second set of one or more VVOLs used by a second application. Performance may be critical to the second application and therefore the second policy profile 220*n* may specify that a high performance storage tier, such as flash storage or a high performance rotating disk drive, is needed. Additionally, the second policy profile 220*n* may require thick device provisioning, and a RAID-1 or RAID-5 configuration. The second policy profile 220*n* may also include a second QOS limit, such as 1000 I/Os per second, 1000 KBs/second, and the like.

A policy profile may include all or some of the capabilities that may be exposed by a data storage system in its capability profile. For example, the data storage system may have an associated capability profile 210 which specifies 6 different capabilities. A policy profile may completely (e.g., for all 6 capabilities) or partially (e.g., less than 6 capabilities) specify capability requirements. For example, a policy profile may specify capability requirements for only a single capability. More generally, the policy profile may specify capability requirements related to any one or more identified capabilities exposed by a data storage system whereby the identified capabilities may be included in the capability profile of the data storage system. To further illustrate, a data storage system may support 6 capabilities as noted above. Thus, a capability profile for the data storage system may include all 6 capabilities with constraints identifying different values for supported configurations in the data storage system. A virtualization administrator may analyze requirements for storage to be provisioned for a particular application and determine that only 2 particular capabilities are important for storage provisioned for the application. Thus, the virtualization administrator may create a policy profile for VVOLs used by the particular application where the policy profile only specifies requirements for the 2 capabilities of importance. Such a policy profile may be characterized as a partially specified policy profile.

It should be noted although the example 200 includes only a single capability profile, if there are multiple data storage systems or different available storage resources with different exposed capabilities from which storage may be provisioned, an embodiment may include a different capability profile for each such data storage system or type of storage resource.

Referring to FIG. 5, shown is an example 300 illustrating in more detail information that may be included in a capability profile. The capability profile 310 may include the following identifying details regarding the characteristics of storage resources available when provisioning storage for a logical device such as a VVOL:

line 310*a* identifying that storage resource configurations for provisioning may include flash-based storage;

line 310*b* identifying that drive types of EFD, SAS, NL-SAS, and SATA are available for provisioning;

line 310*c* identifying that RAID groups having types of RAID-5, RAID-6 and RAID-10 are available for provisioning;

line 310*d* identifying a QOS limit of 20,000 KBs per second; and line 310*f* identifying that a logical device may be provisioned as either a thick or thin logical device.

It should be noted that in at least one embodiment, one or more of the capabilities illustrated in FIG. 5 may not be exposed as a capability parameter or option. For example, in one embodiment, although used in connection with techniques herein, the capability options of line 310*a* may not be exposed as configurable or selectable options by a user in a policy profile and thus may also not be exposed in the capability profile. The flash parameter of line 310*a*, for example, may alternatively be inferred from whether one or more other capabilities are included in a configuration such as drive type, and the like.

Generally, the example 300 illustrates different capabilities (as applied to an available storage resource) that may be exposed by a data storage system each having different possible constraints or values. Assuming the same capabilities and capability profile of FIG. 5, reference is now made to FIG. 6 to further illustrate two different policy profiles that may be specified for use with the capability profile of FIG. 5.

Additionally, it should be noted an embodiment may also specify multiple capability profiles for a single data storage system rather than a single capability profile such as 310. For example, an embodiment may specify 3 capability profiles for a single data storage system where each such capability profile may specify a finer granularity of capabilities since the multiple possibilities of combinations of different capabilities illustrated by the example 300 may not be configured in a data storage system. For example, rather than specify a single capability profile as in the example 300, an embodiment may specify the following 3 capability files for the single data storage system:

Capability file 1: Drive type=EFD, RAID type=RAID-10, . . . .
Capability file 2: Drive type=SAS, RAID type=RAID-5, . . . .
Capability file 3: Drive type=NL-SAS, RAID type=RAID-6, . . . .

Figure 6:
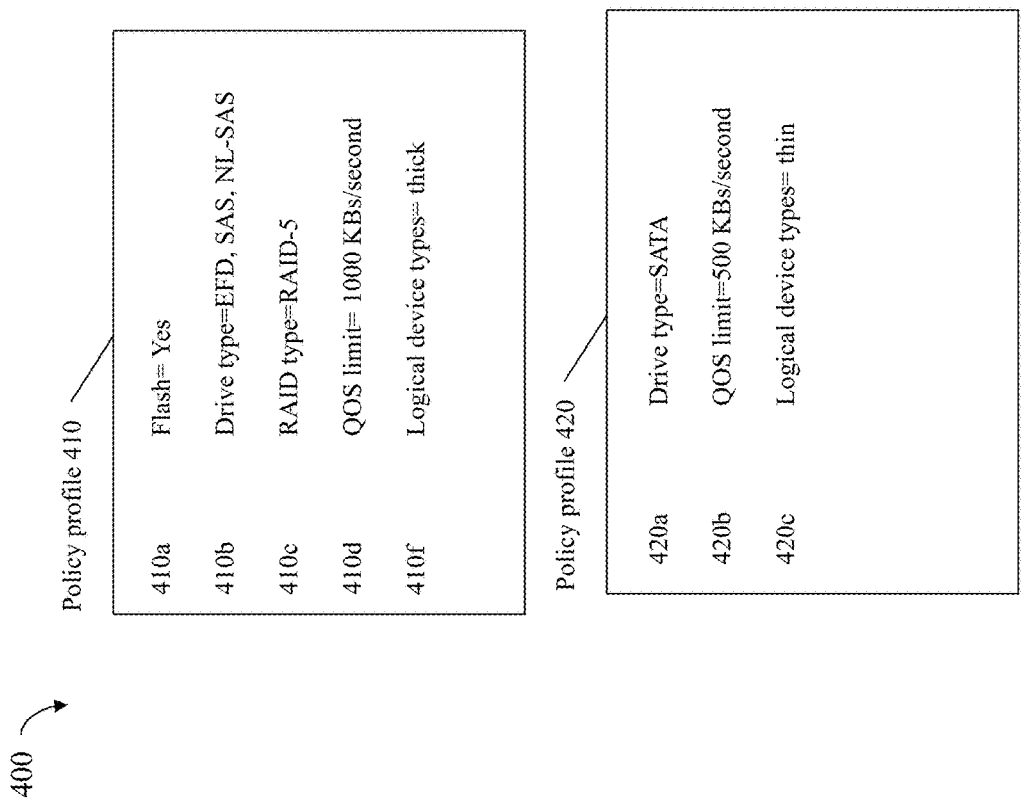

Referring to FIG. 6, shown are examples 400 illustrating in more detail information that may be included in a policy profile. Element 410 is a first example of information that may be included in a policy profile. For example, policy profile 410 may be specified for a critical performance application such as the second application mentioned above in connection with FIG. 4. The policy profile 410 may include the following identifying details regarding the requested characteristics of storage resources when provisioning storage for a logical device such as a VVOL:

line 410*a* indicating that storage resource configurations for provisioning include flash-based storage;

line 410*b* identifying that any of the drive types of EFD, SAS and NL-SAS, be used for provisioning storage;

line 410*c* identifying that storage is to be provisioned from a RAID-5 group;

line 410*d* identifying a QOS limit of 1000 KBs per second; and line 410*f* identifying that the logical device be provisioned as a thick logical device.

Element 420 is a second example of information that may be included in a policy profile. For example, policy profile 420 may be specified for an application where cost is more important than performance (e.g., where performance is not critical). The policy profile 420 may be used, for example, to provision storage for VVOLs for use with the first application mentioned above in connection with FIG. 4. The policy profile 420 may include the following identifying details regarding the requested characteristics of storage resources when provisioning storage for a logical device such as a VVOL:

line 420*a* indicating that a SATA drive type is to be used for provisioning storage;
line 420*b* indicating a QOS limit of 500 KB s/second; and
line 420*c* indicating that the logical device is to be provisioned as a thin or virtually provisioned device.

It should be noted that the policy profile 420 only specifies some available capabilities and associated constraints since, in this example, these may the only capabilities of importance when provisioning storage for a particular application.

In at least one embodiment, configured data storage resources may include one or more storage pools. Each storage pool may include one or more physical storage devices that may be configured into one or more RAID groups. Characteristics of each storage pool may be represented by a capability profile denoting the particular characteristics of the available storage pool resource. In at least one embodiment, configured storage resource may include one or more storage containers. A storage container may represent storage capacity available for creating or provisioning storage for VVOLs. A storage container may build upon, or be configured from, allocated storage of one or more storage pools. Thus, capabilities of a storage container may identify those exposed capabilities or characteristics of the available storage container resource. Storage containers are one type of mechanism or logical storage resource entity configured for sharing between multiple tenants of the data storage system. Consistent with other discussion herein, a VVOL may be characterized as a first class storage object that represents a single drive or logical device used by a VM, whereby VVOLS are created within storage containers (e.g., VVOLS are configured from, or have storage provisioned from, storage containers).

Based on the above, a policy match may be defined between capabilities of a storage container and capabilities of a policy profile (e.g., capabilities of storage container matches a particular policy profile). With such a policy match, the storage container may be characterized as supporting all capabilities referenced or specified by the matching policy profile and constraints for each of the capabilities specified by the policy profile match or otherwise overlap with constraints for corresponding capabilities of the storage container. In this case the storage container having an associated configuration as expressed by a set of capabilities matches characteristics of the storage requested by the matching policy profile. It should be noted that if the policy profile, such as specified when creating a new VVOL, omits a capability or constraint, an embodiment may allow a data storage system to make a decision regarding the particular capability or constraint used in connection with configuring the VVOL. For example, omitting RAID type in the policy may allow the data storage system software freedom and flexibility to match to any suitable RAID configuration (where such suitability may be determined by the storage system such as using rules or other definitions in accordance with best practices).

Generally, each possible candidate storage system resource configuration may be expressed using N capabilities (N being a positive integer) so that each such configuration is a point in N-dimensional space (e.g., where the N capabilities represent the different N axes). The capability profiles, and thus set of capabilities of configured storage containers, and policy profiles may each correspond to an area in the N-dimensional space. A match between capabilities of a storage container and a policy profile may also be viewed as an N-dimensional space area that is an intersection of a first area of the capabilities of the storage container and a second area of the policy profile. The foregoing is a general and theoretical expression of processing that may be performed in an embodiment in accordance with techniques herein to determine a storage container used when provisioning storage for a requested VVOL (having capabilities as identified in the policy profile).

In accordance with techniques herein, consumption of storage resource may need to be limited such as in accordance with specified QOS limits as discussed elsewhere herein. For example, storage system resource consumption for servicing I/O operations may need to be limited in a first use case where the storage system is installed at a service provider where the storage system is shared between multiple customers of the service provider (e.g., the multiple customer are paying for storage and services hosted by the provider on the storage system). In such an embodiment, each customer may be paying the provider for a certain level of service such as related to I/O performance with respect to customer data on the storage system. In connection with a second use case, multiple applications may have their data stored on the single data storage system. In order to avoid having a single application using an excessive amount of storage resources) such as when the single application issues an excessive amount of I/O operations), QOS limits may be utilized to ensure that the single application does not consume an excessive amount of resources whereby other applications accessing their data on the same system would experience adverse I/O performance.

Described in following paragraphs are techniques that may be used in an embodiment connection with applying and using QOS limits. In at least one embodiment, a token and bucket technique may be utilized to enforce specified QOS limits. Generally, a bucket may be allocated for use with a storage resource. The bucket may be filled with tokens at a specified rate in accordance with a specified QOS limit of the storage resource. Thus, a current amount of tokens in the bucket may be in accordance with the specified QOS limit of the storage resource associated with the bucket. Additionally, the current amount of tokens in the bucket may denote a current amount of tokens available for consumption in connection with servicing I/O operations directed to the storage resource associated with the bucket. Servicing the I/O operation directed to the storage resource may consume an amount of one or more tokens from the bucket associated with the storage resource. As such, the amount of the storage resource consumed may correspond to consuming, decrementing or taking one or more tokens from the bucket. If a bucket is empty having no tokens available for consumption, the corresponding I/O operations directed to the resource associated with the bucket may be queued. In at least one embodiment, the queued I/O request may be processed at a later time subsequent to the bucket being replenished with a sufficient amount of tokens (e.g., corresponding to the amount of resources needed in connection with servicing the I/O operation). As noted above, the replenishment of tokens in the bucket of the storage resource may be in accordance with the specified QOS limit for the storage resource. In at least one embodiment, there may be two or more levels of storage resources where each of the storage resources has its own QOS limit and bucket of tokens. For example, in a virtualization environment as described above, a storage container may denote a first storage resource at a first level and a VVOL configured from the storage container may denote a second storage resource at a second level. A first QOS limit and first bucket of tokens may be associated with the storage container. A second QOS limit and second bucket of tokens may be associated with a single VVOL configured from the storage container. The first bucket of tokens may denote an amount of tokens in accordance with the first QOS limit. The first bucket of tokens may denote an amount of storage resources available for consumption in connection with servicing I/O operations directed collectively to the storage container, such as I/Os directed to any of the VVOLs included in, or configured from, the storage container. In a similar manner, the second bucket of tokens may denote an amount of tokens in accordance with the second QOS limit. The second bucket of tokens may denote an amount of storage resources available for consumption in connection with I/Os directed to a single VVOL.

Thus, the second QOS limit may be characterized in one aspect as a lower level or finer granularity of control over resources consumed in connection with servicing I/Os directed to a single VVOL. In accordance with techniques herein, an I/O directed to the VVOL included in the storage container results in one or more tokens being consumed from both the first bucket and the second bucket. In at least one embodiment in accordance with techniques herein as described in more detail below, the capabilities of a storage container may include a QOS limit, such as 20,000 KBs/second, which may be applied collectively or in the aggregate with respect to all other resources, such as VVOLs, configured from the storage container.

It should be noted that following paragraphs set forth examples of techniques herein with two levels of dependent resources or objects in a virtualization environment. For example, following paragraphs refer to examples in connection with a first QOS limit for a storage container and second QOS limit for a single VVOL configured with the storage container. However, more generally, techniques herein may be used in connection with QOS limits applied in connection with other storage resources, in other environments, and also in other storage resource hierarchies having more than 2 levels of dependent or configured storage resources.

To efficiently apply QOS limits or controls in virtualization environments and, more generally, in other environments where there are multiple levels of dependent objects, an embodiment in accordance with techniques herein may utilize a hierarchical structure of buckets in accordance with QOS limits at the storage container and also at the VVOL level. QOS limits may be assigned individually per storage container and per VVOL whereby there is one bucket per storage container and also one bucket per VVOL assigned a QOS limit.

Figure 7:
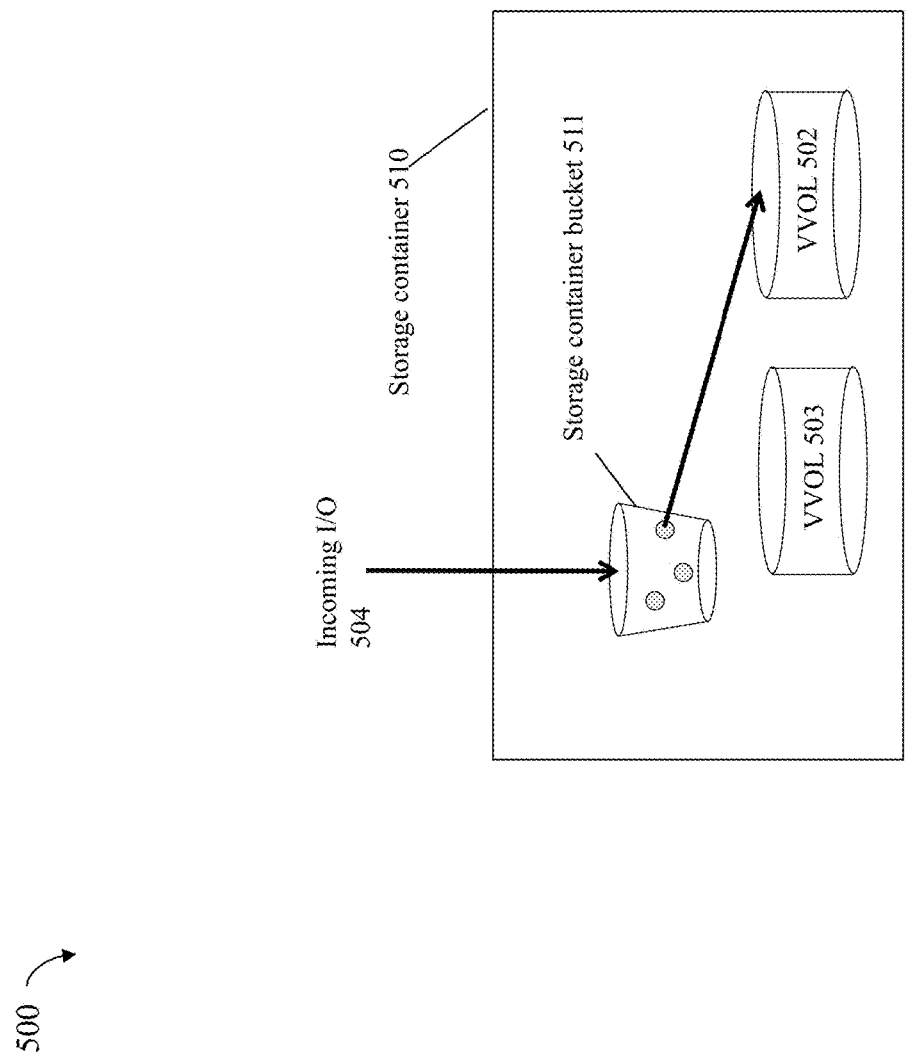
FIGS. 7, 8, and 9 are examples illustrating use of buckets of tokens in embodiments in accordance with techniques herein.
Figure 8:
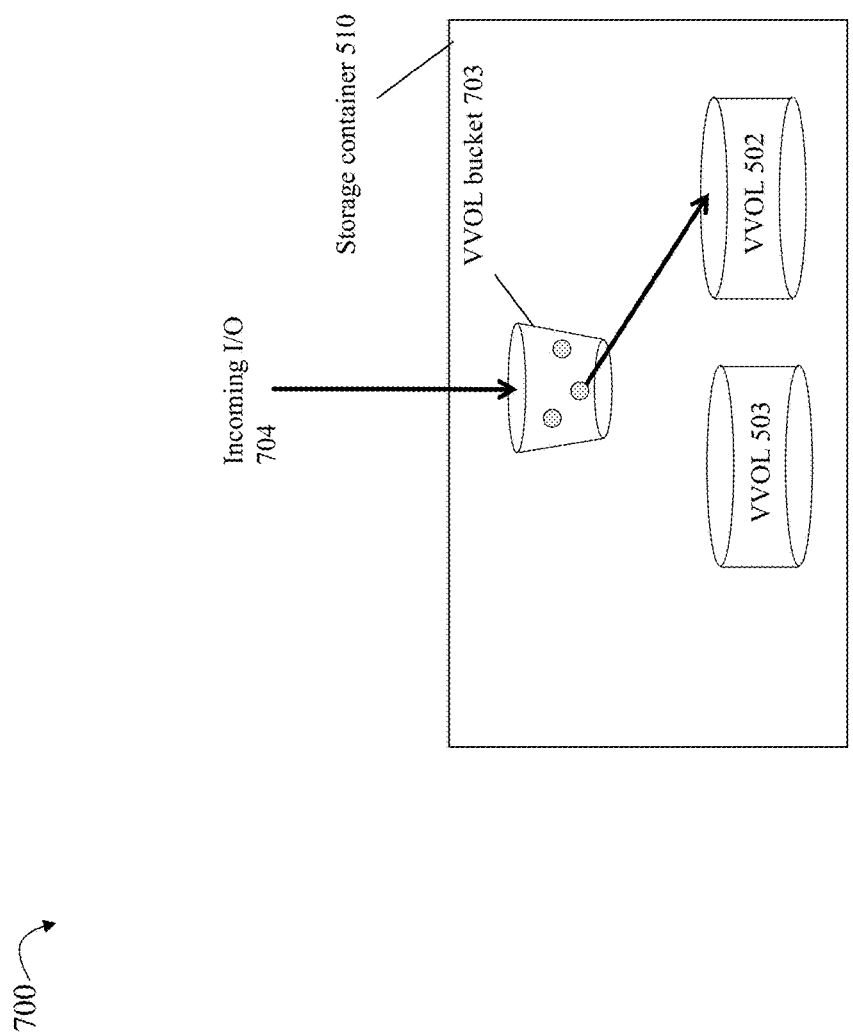
Figure 9:
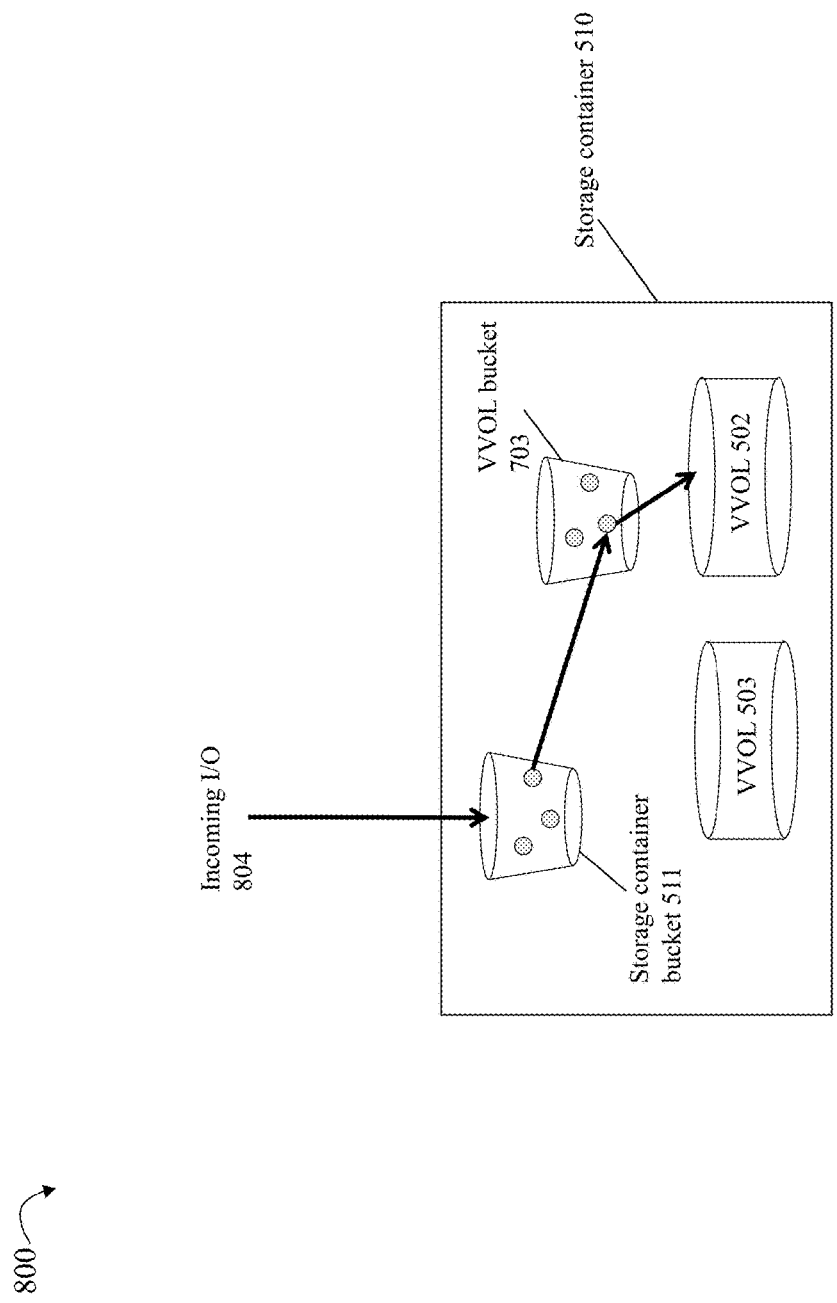

In connection with further illustrating use of buckets of tokens, reference is made to FIGS. 7, 8 and 9.

Referring to FIG. 7, shown is an example 500 illustrating a case where a QOS limit and associated bucket of tokens are only applied at the storage container level. The example 500 includes storage container 510, the bucket 511 of tokens for the storage container 510, VVOLs 502 and 503 created within the storage container 510, and an incoming I/O 504. The incoming I/O 504 may be directed to the VVOL 502 created in storage container 510. The bucket 511 may be populated with tokens deposited in accordance with a rate denoted by the QOS limit specified for the storage container 510. For illustration in this example, assume the I/O 504 consumes only a single token from bucket 511. In this case, a token is consumed from bucket 511 and the I/O 504 may be serviced. There is no bucket at the VVOL level for VVOL 502 in this example. All VVOLs in storage container 510 share the QOS limit, and thus the bucket of tokens 511, for the storage container 510. Thus, all I/Os directed to VVOLs 502 and 503 result in consuming a token from the bucket 511 in order to be serviced. Once the QOS limit or number of tokens in the bucket 511 is exhausted, no I/O directed to either of the VVOLs 502, 503 in storage container 510 is service until more tokens in bucket 511 become available. In at least one embodiment, the bucket 511 may have tokens deposited in accordance with a rate denoted by the QOS limit of the storage container 510. For example, if the QOS limit for storage container 510 is 20,000 KBs/second, each second, processing may be performed to deposit increase the number of tokens in the bucket 511 by 20,000.

Referring to FIG. 8, shown is an example 700 illustrating a case where a QOS limit and associated bucket of tokens are only applied at the single VVOL level. The example 700 includes storage container 510, and VVOLs 502 and 503 created within the storage container 510, as in FIG. 7. The example 700 also includes the bucket 703 of tokens for the single VVOL 502 and an incoming I/O 704 directed to the VVOL 502 created in storage container 510. The bucket 703 may be populated with tokens deposited in accordance with a rate denoted by the QOS limit specified for the VVOL 502. For illustration in this example, assume the I/O 704 consumes only a single token from bucket 703. In this case, a token is consumed from bucket 703 and the I/O 704 may be serviced. There is no bucket at the storage container level for storage container 510 in this example. Once the QOS limit or number of tokens in the bucket 703 is exhausted, no I/O directed to VVOL 502 is serviced until more tokens in bucket 703 become available. In at least one embodiment, the bucket 703 may have tokens deposited in accordance with a rate denoted by the QOS limit of the VVOL 502. For example, if the QOS limit for VVOL 502 is 1,000 KBs/second, each second, processing may be performed to deposit or increase the number of tokens in the bucket 703 by 1,000. Although, for example, the QOS limit for VVOL 502 may be exhausted whereby there are no tokens in bucket 703, a second incoming I/O directed to VVOL 503 is still serviced since, in this example, there is no QOS limit specified for VVOL 503. Although not illustrated in FIG. 8, if a QOS limit and corresponding bucket of tokens are specified for VVOL 503 and there are a sufficient number of tokens in the bucket to service the second I/O directed to VVOL 503, then the appropriate number of tokens from the bucket for VVOL 503 is consumed and the second I/O is serviced.

Referring to FIG. 9, shown is an example 800 illustrating a case where QOS limits and associated buckets of tokens are applied at both the storage container level and the single VVOL level. The example 800 includes storage container 510, and VVOLs 502 and 503 created within the storage container 510, as in FIGS. 7 and 8. The example 800 also includes the bucket 703 of tokens for the single VVOL 502 and an incoming I/O 804 directed to the VVOL 502 created in storage container 510. The bucket 703 may be populated with tokens deposited in accordance with a rate denoted by the QOS limit specified for the VVOL 502 as described above in connection with FIG. 8. Additionally, the example 800 includes bucket 511 of tokens for the storage container 510. The bucket 511 may be populated with tokens deposited in accordance with a rate denoted by the QOS limit specified for the storage container 510 as described above in connection with FIG. 7. In this example, servicing I/O 804 may include consuming tokens from both the storage container bucket 511 and VVOL bucket 703. For illustration in this example, assume the I/O 804 consumes only a single token from bucket 703 and also a single token from bucket 511. In this case, prior to servicing I/O 804, a first token is consumed from the storage container bucket 511 and a second token is consumed from VVOL bucket 703. In the example 800, either of the buckets 511 or 703 may be exhausted. Once the QOS limit or number of tokens in the storage container bucket 511 is exhausted, no I/O directed to any of the VVOLs 502, 503 is serviced until more tokens in bucket 511 become available. Exhausting the supply of tokens in the storage container bucket 511 prior to exhausting tokens in VVOL bucket 703 results in all I/Os directed to either VVOL 702 or 703 to be queued, or remain pending, until additional available tokens are placed in bucket 511 (e.g., such as when the bucket 511 is replenished each time period in accordance with the storage container 510's QOS limit). Thus, I/Os directed to VVOL 502 may be queued even though there are tokens available in bucket 703 if there are no available tokens in the storage container bucket 511. Similarly, I/Os directed to VVOL 503 may be queued even though there is no QOS limit or bucket for VVOL 503 if there are no available tokens in the storage container bucket 511.

In one aspect, the storage container 510 may be characterized as a higher level object or entity including one or more lower level objects representing one or more VVOLs, such as VVOLs 502, 503, included in the storage container 510. Thus the foregoing illustrates a 2 level hierarchy of dependent objects whereby whether an I/O (e.g., 804) directed to a lower level object (e.g., VVOL 502) is serviced at a current point in time depends on the availability of tokens in the bucket (e.g., bucket 703) associated with the lower level object (e.g., VVOL 502) as well as the availability of tokens in the other bucket (e.g., bucket 511) associated with the higher level object (e.g., storage container 510). Sufficient tokens to service the I/O must be available in all levels of buckets (e.g., 511 and 703) in order for the I/O to be serviced. More generally, QOS limits and buckets may be associated with more than 2 levels of resources in a manner similar to that as just described above in FIG. 9 with respect to 2 levels of QOS limits and buckets.

Figure 10:
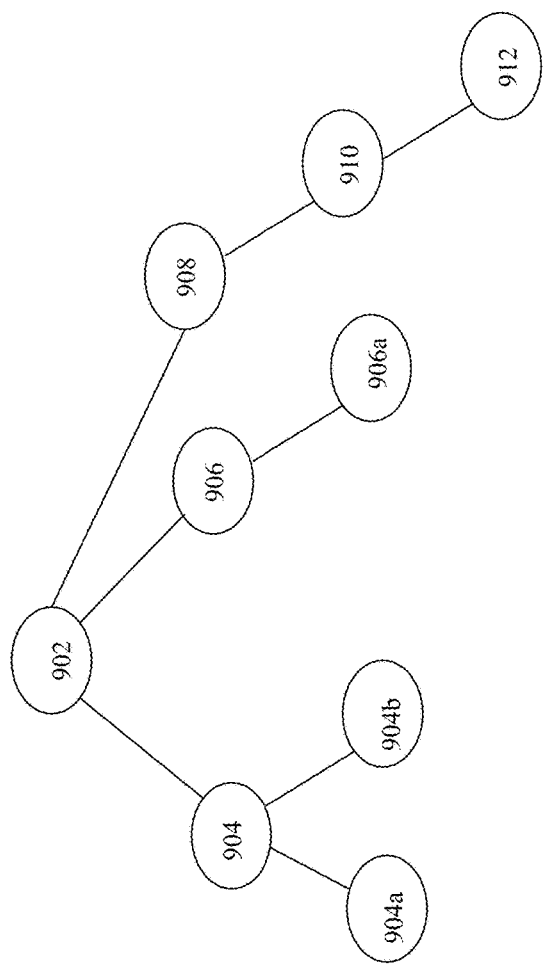
FIG. 10 is an example of a hierarchical structure representing multiple levels of QOS limits and buckets of storage resources in an embodiment in accordance with techniques herein.

Referring to FIG. 10, shown is a hierarchical representation of different QOS limits and buckets that may be specified in an embodiment in accordance with techniques herein. The example 900 includes nodes, 902, 904, 904a-b, 906, 906a, 908, 910 and 912. Node 902 may denote the root of the hierarchical structure of storage resources and QOS limits. Each of the other nodes 904, 904a-b, 906, 906a, 908, 910 and 912 may represent a storage resource or entity (e.g., storage container, VVOL, and the like, that may be specified in an embodiment) and its associated QOS limit and bucket. A path may be defined from the root to any other node in the tree. For example, a path may include nodes in the path from the root to a specified one of the leaf nodes 904a-b, 906a, or 912. All nodes, other than the root node, included in the single path from the root to a leaf node may denote QOS limits or buckets applied to an I/O directed to the entity represented by the leaf node. For example, a first path from the root node 902 to leaf node 906a may include nodes 902, 906 and 906a. Node 906 may represent the storage container 510 and its associated QOS limit and bucket 511, and node 906a may represent the VVOL 502 and its associated QOS limit and bucket 703. Storage resource or entities and associated QOS limits and buckets represented by nodes 906 and 906a denote the 2 levels of buckets/QOS limits applied in connection with I/Os directed to VVOL 502/node 906a.

As another example, with reference back to FIG. 9, assume that a first QOS limit and bucket are specified for storage container 510, a second QOS limit and bucket are specified for VVOL 502 and a third QOS limit and bucket are specified for VVOL 503. In this case, node 904 may represent the foregoing first QOS limit and bucket for storage container 510, node 904a may represent the foregoing second QOS limit and bucket for VVOL 502, and node 904b may represent the foregoing third QOS limit and bucket for VVOL 503. An I/O directed to VVOL 502 results in consuming tokens from buckets associated with nodes 904 and 904a. An I/O directed to VVOL 503 results in consuming tokens from buckets associated with nodes 904 and 904b.

As yet another example, consider a case with 3 levels of objects or entities. For example, assume that a first QOS limit and bucket are specified for storage container 510, a second QOS limit and bucket are specified for a first VM, and a third QOS limit and bucket are specified for VVOL 502. In this example, the first and third QOS limits may be as described above in connection with other examples. Additionally, the second QOS limit may be an additional QOS limit applied collectively with respect to I/Os issued from a particular VM and its application. In this case, node 908 may represent the foregoing first QOS limit and bucket for storage container 510, node 910 may represent the foregoing second QOS limit and bucket for the first VM, and node 912 may represent the foregoing third QOS limit and bucket for VVOL 502. An I/O directed to VVOL 502 results in consuming tokens from buckets associated with nodes 908, 910 and 912. In order for the I/O to be serviced at a point in time, there needs to be a sufficient number of available tokens in buckets corresponding to nodes 908, 910 and 912.

The structure of the example 900 is merely one example of a possible hierarchical structure that may be used to represent the levels of entities or storage resources and associated QOS limits and buckets in a particular embodiment. Generally, there may be any suitable number of levels of storage resource and associated QOS limits and buckets. As described herein, individual QOS limit and buckets may be specified for each entity, such as each storage container, and each VVOL, wherein the QOS limits at the different levels in the hierarchy may be applied simultaneously in connection with servicing I/O operations.

In examples above such as with a two level hierarchy, the higher level object or entity having a QOS limit may be a storage container, and the lower level object or entity created within (using resources of) the storage container may be a VVOL where a second QOS limit may be specified for the VVOL. As another example of the different objects or entities in a two level hierarchy to which techniques herein may be applied, the higher level object or entity may be a storage pool or RAID group, and the lower level object or entity created within (using resource of) the storage pool or RAID group may be a LUN (e.g., logical device) or file system. In connection with a file system, yet a lower level object or entity created within (using resource of) the file system may be a file share or a file. Thus, another example of a 3 level hierarchy for which a QOS limit and associated bucket may be specified for each of the 3 levels, from highest to lowest level, includes a storage pool or RAID group, a file system configured in the storage pool or RAID group, and a file or file share configured in the file system.

In at least one embodiment, each bucket at each level of the hierarchy may be filled with an additional number of tokens per time period in accordance with a rate specified by the QOS limit of each bucket. For example, as described herein, the QOS limits for storage container 510 and VVOL 502 may be specified in blocks per second, such as 20,000

KBs/second for storage container 510 and 1000 KB s/second for VVOL 502. Assume, for example, a single token denotes a single KB of data read or written in an I/O operation. In this manner, every second, an additional 20,000 tokens may be added to storage container bucket 511, and an additional 1,000 tokens may be added to VVOL bucket 703. More generally, an embodiment may have each token correspond to any suitable number of one or more units (e.g., such as a single block) consumed in connection with an incoming I/O operation. In this manner, each incoming I/O operation consumes a number of one or more tokens based on the particular size of the I/O operation. For example, assuming 1 token=1 KB of data, if the I/O operation directed to VVOL 503 reads or writes 3 KB of data, 3 tokens may be consumed from bucket 511 and 3 tokens may be consumed from bucket 703. If another I/O operation directed to VVOL 503 reads or writes 10 KB of data, 10 tokens may be consumed from bucket 511 and 10 tokens may be consumed from bucket 703. In at least one embodiment, a background process or thread may periodically execute to add appropriate tokens to each bucket, as noted above, in accordance with the various levels of specified QOS limits.

In at least one embodiment, if there are not enough tokens in all levels of buckets needed for a particular I/O, then the I/O may be queued. For example, assume as in the latter example above and with reference to FIG. 9, that 10 tokens are needed from each of buckets 511 and 703 to service a particular first I/O. In this first embodiment, the first I/O may be queued if there are not at least 10 tokens in each of the buckets 511 and 703. In order for the queued first I/O to be serviced, there needs to be at least 10 tokens in each of the buckets 703 and 511. In this case, other subsequent I/Os may be serviced prior to the queued first I/O if such subsequent I/Os do not require more tokens than are available in each bucket. For example, a second I/O operation may consume 2 tokens from each of the buckets 511 and 703 at a point in time when there are 8 tokens in each bucket. Since there were only 8 tokens per bucket 703 and 511 when the first I/O requiring 10 tokens was received, the first I/O was queued as noted above. However, the second subsequent I/O may be serviced whereby 2 tokens from each of buckets 703 and 511 are consumed. In such an embodiment the I/Os may be processed out of order with respect to the order in which they are received by the data storage system. In such an embodiment, if the host issues the foregoing second I/O operations without waiting for first I/O operation to complete, both the first and second I/Os may be pending at the same time. If the two I/O operations are dependent (e.g., both write to the same VVOL and VVOL location), an embodiment may not guarantee any particular order in which the two I/Os are performed and thus may not guarantee any particular outcome with respect to the resulting data.

As a variation to the foregoing, in at least one embodiment, if there are not enough tokens in all levels of buckets needed for a particular I/O but there is at least one token in each such bucket level, then the I/O may be allowed to proceed. In this manner, the net amount of tokens in a bucket may go negative whereby such tokens may be characterized as "borrowed" from the allotment of tokens for the next time period. For example, assume as above and with reference to FIG. 9, that 10 tokens are needed from each of buckets 511 and 703 to service a particular first I/O. Further assume that there are 8 tokens in each of the buckets 511 and 703. In this case, the first I/O may be serviced since there is at least one token in each of the required bucket 511 and 703. In this case, the net amount of tokens is −2 in each of the buckets 511 and 703. If a second I/O operation is now received that consumes tokens in buckets 511 and 703, the second I/O operation is not serviced at the current time and is queued since there is not at least one token in each of the buckets 511 and 703. Additionally, once a bucket has a negative net number of tokens, no I/O consuming any number of tokens from the bucket is allowed to proceed until the bucket has been refilled (e.g., has a positive number of tokens).

Figure 11:
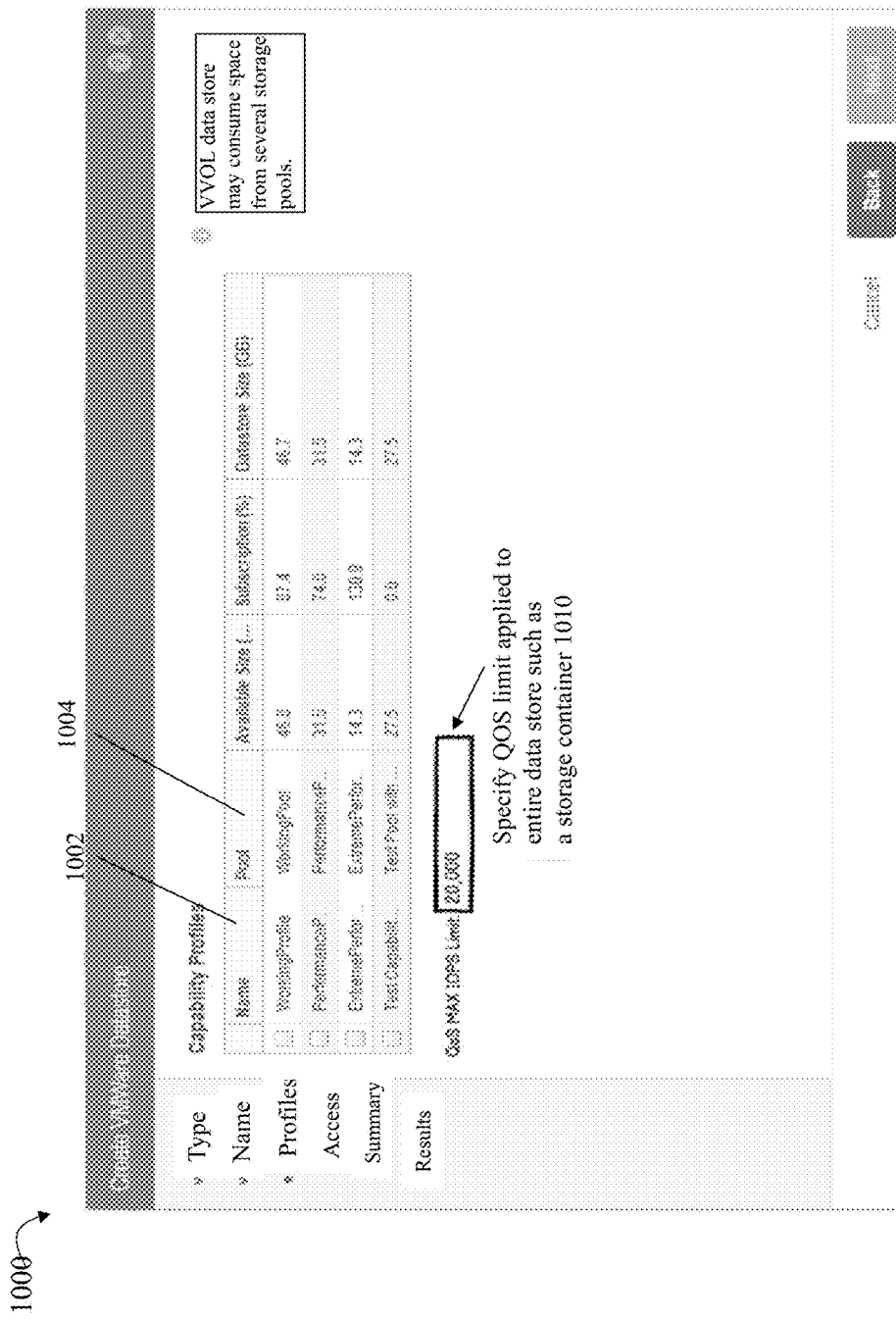
FIGS. 11, 12 and 13 are examples of screenshots that may be included in a user interface (UI) in an embodiment in accordance with techniques herein.

Referring to FIG. 11, shown is an example of a screenshot of a graphical user interface (GUI) that may be used in an embodiment in accordance with techniques herein. The example 1000 is a screenshot that may be included in a workflow for creating or configuring a VVOL data store such as a storage container described elsewhere herein. In this example 1000, a user may specify the QOS limit for the particular storage container being created. Element 1010 in this example denotes that the QOS limit for the storage container is 20,000 I/Os per second (IOPS). The QOS limit in 1010 is expressed in terms of an I/O processing rate rather than a data transfer rate, such as number of blocks/second, KBs/second, and the like. Element 1002 denotes the capability profiles of the corresponding storage pools listed in 1004. When configuring the storage container, one or more of the storage pools in column 1004 may be selected to provide provisioned storage for the storage container being created in the workflow.

Figure 12:
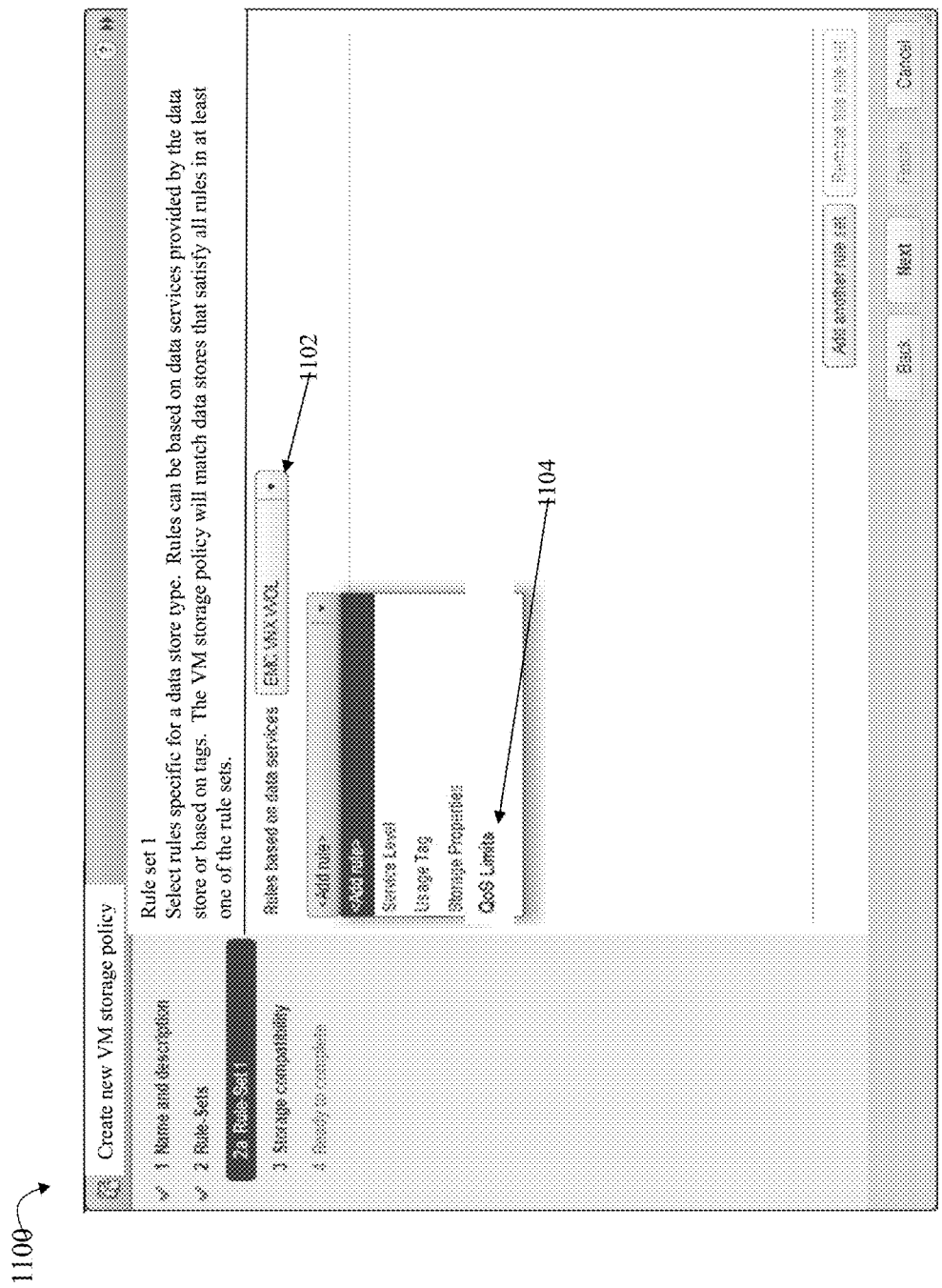

Referring to FIG. 12, shown is another example of a screenshot of a GUI that may be used in an embodiment in accordance with techniques herein. The example 1200 is a screenshot that may be included in a workflow for creating or configuring a VVOL such as described elsewhere herein. The example 1200 is a screenshot in connection with creating a new storage policy that will be used in connection with a VM. In particular, the storage policy will be applied in connection with any VVOLs created for use by the VM. Element 1102 denotes the UI element selected to specify that the storage policy being created will be applied in connection with VVOLs created for a VM. Selection 1104 denotes that a rule is being added to the policy to define a QOS limit applied to each VVOL created for the VM. Responsive to selecting 1104, the resulting screenshot of FIG. 13 may be displayed. In the example 1200, as a next step, the user may specify the QOS limit in 1204. In this example, the QOS limit of 1,000 IOPS is specified for each VVOL created for use by the VM.

Figure 13:
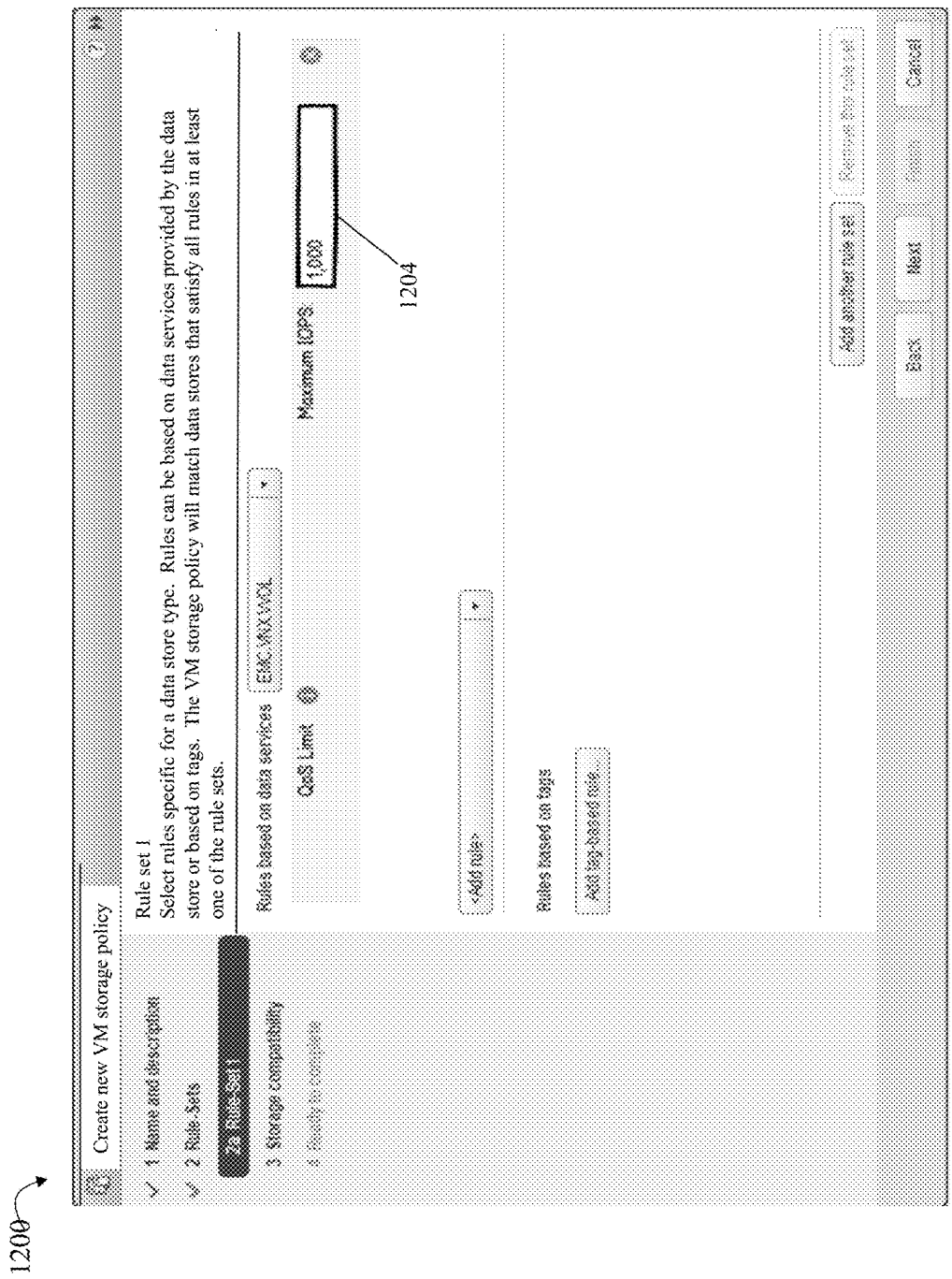

In at least one embodiment using the example screenshots in connection with FIGS. 12 and 13, a storage policy profile is being created and may be applied in connection with any VVOLs subsequently provisioned for the VM. Thus, for example, the QOS limit of 1204 in FIG. 13 may be specified for each individual VVOL created for the VM. In this manner, FIGS. 12 and 13 are examples of screenshots in connection with a VM workflow where the specified policy profile and associated QOS limit 1204 may be applied at the VVOL level, per VVOL of the VM.

What will now be described are flowcharts of processing steps that may be performed in an embodiment in accordance with techniques herein where such flowcharts summarize processing as described above. The flowcharts summarize processing that may be performed in connection with a two level hierarchy of buckets and QOS limits for a storage container and a VVOL created or configured in the storage container. However, consistent with discussion herein, one of ordinary skill in the art may readily and more generally apply such processing in connection with other environments and entities and in cases with more than two levels of buckets and QOS limits.

Figure 14:
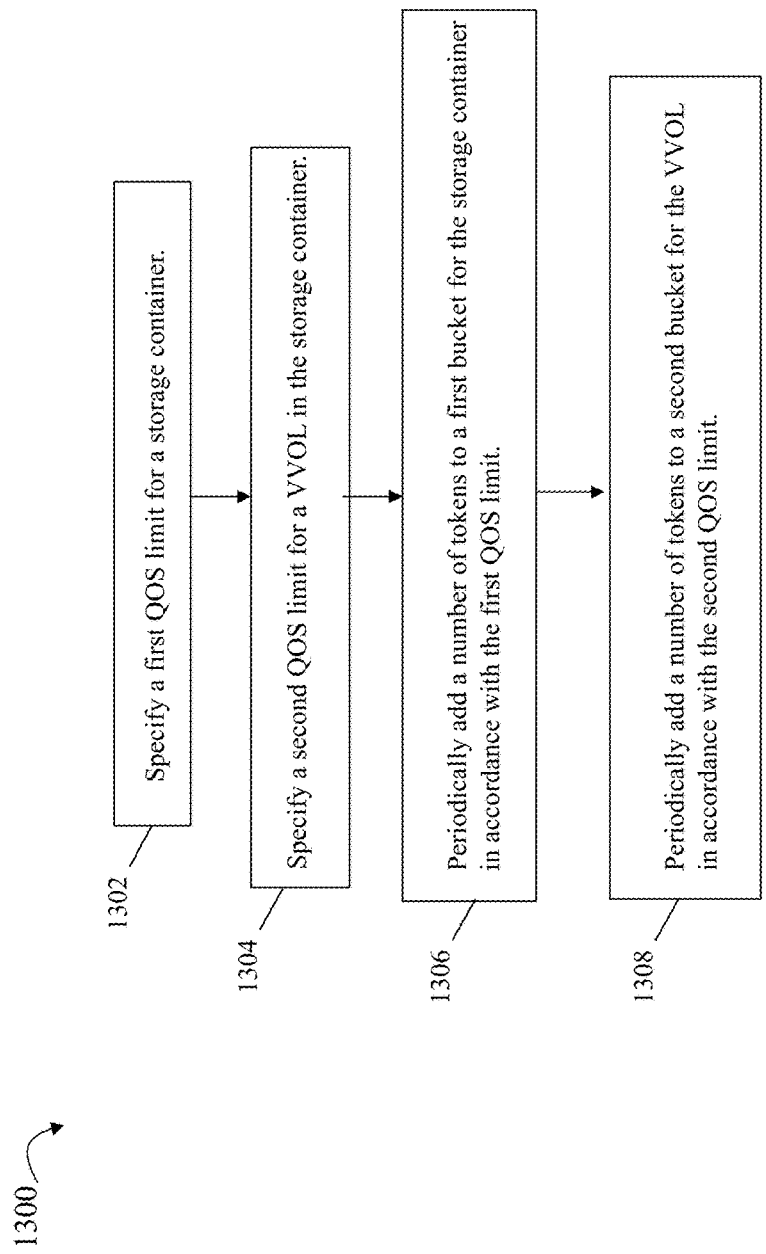
FIGS. 14 and 15 are flowcharts of processing steps that may be performed in an embodiment in accordance with techniques herein.

Referring to FIG. 14, shown is a first flowchart 1300 of processing steps that may be performed in an embodiment in accordance with techniques herein. At step 1302, a first QOS limit may be specified for a storage container. At step 1304, a second QOS limit may be specified for a VVOL created or configured within the storage container (having the first QOS limit from step 1302). At step 1306, processing may be performed to periodically add a number of tokens to a first bucket for the storage container in accordance with the first QOS limit. At step 1308 processing may be performed to periodically add a number of tokens to a second bucket for the VVOL in accordance with the second QOS limit.

Figure 15:
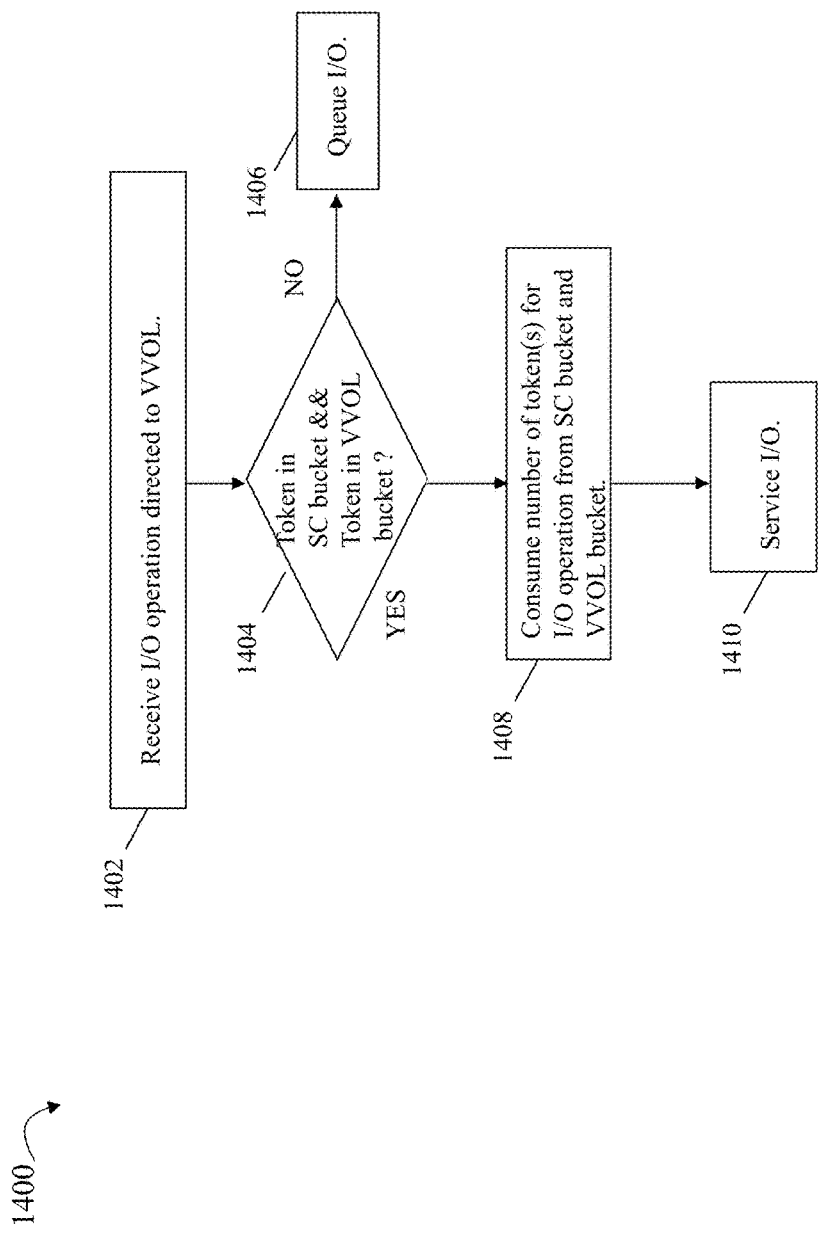

Referring to FIG. 15, shown is a second flowchart 1400 of processing steps that may be performed in an embodiment in accordance with techniques herein. At step 1402, an I/O operation may be received that is directed to the VVOL created and configured as in connection with the first flowchart processing 1300. At step 1404, a determination may be made as to whether there is at least one token in the storage container's (SC's) bucket and at least one token in the VVOL's bucket. If step 1404 evaluates to no, control proceeds to step 1406 to not service the I/O and place the I/O on a queue of pending I/Os. At a later point in time after additional tokens are added to the SC's bucket and/or VVOL's bucket, I/Os from the pending I/O queue will be retrieved and processed if there is at least one token available in the SC's bucket and at least one token in the VVOL's bucket. If step 1404 evaluates to yes, control proceeds to step 1408 where the number of tokens needed for the I/O operation are consumed from the SC's bucket and also where the number of tokens needed for the I/O operation are consumed from the VVOL's bucket. The particular number of tokens consumed may vary with the size of the I/O operation, or more generally, with the particular units associated with each token in the buckets. At step 1410, the I/O operation is serviced.

It should be noted that processing of FIG. 15 described above in connection with decision step 1404 allows processing of an I/O operation to proceed if there is at least one token in each of the SC's bucket and the VVOL's bucket. In connection with such processing as discussed above, the net number of tokens in a bucket may be negative. Also as discussed above, rather than allowing the I/O operation to proceed if there is at least one token in each of the SC's bucket and the VVOL's bucket, an embodiment may alternatively require that each of the SC's bucket and the VVOL's bucket include at least the number of tokens needed for consumption in order to service the I/O operation. In such an embodiment, the decision step 1404 may be varied such that each of the buckets have the number of tokens needed for consumption in order for the I/O operation to be serviced. For example, if 10 tokens are needed from each of the SC's bucket and the VVOL's bucket and either one of the buckets does not include the needed 10 tokens, then the I/O operation is not processed at the current time and placed on a queue of pending I/O operation (e.g., if each of the SC's bucket and the VVOL's bucket do not include the required 10 available tokens, then step 1404 evaluates to no; step 1404 evaluates to yes only if each of the SC's bucket and the VVOL's bucket include at least the 10 available tokens needed for consumption in order to process the I/O operation). In such an embodiment, at a later point in time after additional tokens are added to the SC's bucket and/or VVOL's bucket, a pending I/O from the pending I/O queue will be retrieved and processed if there both the SC's bucket and the VVOL's bucket contain at least the number of available tokens required for processing the pending I/O.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of processing I/O (input/output) operations comprising:
receiving a first I/O operation directed to a first storage resource, said first storage resource being included in a storage resource hierarchy comprising a plurality of levels of storage resources, wherein a plurality of buckets denote current amounts of tokens available for consumption in connection with servicing I/O operations, each of the plurality of buckets denoting a current amount of available tokens for a corresponding one of the storage resources included in the storage resource hierarchy; and
determining, in accordance with the plurality of buckets of available tokens for the plurality of levels of storage resources, whether to service the first I/O operation, wherein a first bucket of the plurality of buckets denotes the current amount of available tokens for the first storage resource and a second bucket of the plurality of buckets denotes the current amount of available tokens for a second storage resource, wherein servicing the first I/O operation includes consuming a first amount of available tokens of the first bucket and a second amount of available tokens of the second bucket, wherein determining whether to service the first I/O operation includes:
determining, in accordance with the first amount and the second amount, whether the current amount of available tokens in at least one of the first bucket and the second bucket is insufficient to service the first I/O operation and whether there is at least one available token in each of the first bucket and the second bucket; and
responsive to determining that the current amount of available tokens in at least one of the first bucket and the second bucket is insufficient to service the first I/O operation, and determining that there is at least one available token in each of the first bucket and the second bucket, servicing the first I/O operation by performing first processing.

2. The method of claim 1, wherein first processing includes:
decrementing the current amount of available tokens in the first bucket by the first amount; and
decrementing the current amount of available tokens in the second bucket by the second amount.

3. The method of claim 2, wherein said determining whether to service the first I/O operation includes:
if it is determined that there is not at least one available token in each of the first bucket and the second bucket, determining not to service the first I/O operation and placing the first I/O operation in a queue of pending I/O operations to be serviced at a later point in time.

4. The method of claim 3, wherein the first I/O operation is serviced at a later point in time when there is at least one available token in each of the first bucket and the second bucket.

5. The method of claim 1, wherein said determining whether to service the first I/O operation includes:
   determining whether the current amount of available tokens in the first bucket is at least the first amount and whether the current amount of available tokens in the second bucket is at least the second amount; and
   if it is determined that the current amount of available tokens in the first bucket is at least the first amount and that the current amount of available tokens in the second bucket is at least the second amount, performing second processing to service the first I/O operation, said second processing including:
      decrementing the current amount of available tokens in the first bucket by the first amount; and
      decrementing the current amount of available tokens in the second bucket by the second amount.

6. The method of claim 1, wherein the first storage resource and the second storage resource are located in the storage resource hierarchy and wherein the second storage resource is located at a higher level in the storage resource hierarchy than the first storage resource.

7. The method of claim 6, wherein said first storage resource is a virtual volume and the second storage resource is a storage container.

8. The method of claim 7, wherein the first storage resource is a logical device or a file system, and the second storage resource is any of a storage pool or a RAID group.

9. The method of claim 7, wherein the first storage resource is configured within, or using an allocated amount of, the second storage resource.

10. The method of claim 6, wherein each available token in the first bucket and the second bucket represents any of: a single I/O operation, and a unit of storage read or written in connection with I/O operations.

11. The method of claim 1, wherein the first I/O operation includes any of: reading data from the first storage resource, and writing data to the first storage resource.

12. The method of claim 1, further comprising:
   receiving a plurality of maximum limits for the plurality of levels of storage resources, wherein each of the plurality of maximum limits specifies a maximum consumption amount in a specified time period for a corresponding storage resource of the storage resource hierarchy; and
   periodically incrementing the current amounts of available tokens of the plurality of buckets in accordance with the plurality of maximum limits.

13. The method of claim 1, wherein the storage resource hierarchy includes at least three levels, wherein a third bucket of the plurality of buckets denotes the current amount of available tokens for a third storage resource, and wherein servicing the first I/O operation comprises:
   consuming a third amount of available tokens of the third bucket.

14. The method of claim 13, wherein the first storage resource, the second storage resource, and the third storage resource are located in the storage resource hierarchy, and wherein the second storage resource is located at a higher level in the storage resource hierarchy than the first storage resource, and the third storage resource is located at a higher level in the storage resource hierarchy than second resource, and wherein the first storage resource is configured using an allocated amount of the second storage resource, and wherein the second storage resource is configured using an allocated amount of the third storage resource.

15. A system comprising:
   a processor; and
   a memory comprising code stored therein that, when executed by the processor, performs a method of processing I/O (input/output) operations comprising:
      receiving a first I/O operation directed to a first storage resource, said first storage resource being included in a storage resource hierarchy comprising a plurality of levels of storage resources, wherein a plurality of buckets denote current amounts of tokens available for consumption in connection with servicing I/O operations, each of the plurality of buckets denoting a current amount of available tokens for a corresponding one of the storage resources included in the storage resource hierarchy; and
      determining, in accordance with the plurality of buckets of available tokens for the plurality of levels of storage resources, whether to service the first I/O operation, wherein a first bucket of the plurality of buckets denotes the current amount of available tokens for the first storage resource and a second bucket of the plurality of buckets denotes the current amount of available tokens for a second storage resource, wherein servicing the first I/O operation includes consuming a first amount of available tokens of the first bucket and a second amount of available tokens of the second bucket, wherein determining whether to service the first I/O operation includes:
         determining, in accordance with the first amount and the second amount, whether the current amount of available tokens in at least one of the first bucket and the second bucket is insufficient to service the first I/O operation and whether there is at least one available token in each of the first bucket and the second bucket; and
         responsive to determining that the current amount of available tokens in at least one of the first bucket and the second bucket is insufficient to service the first I/O operation, and determining that there is at least one available token in each of the first bucket and the second bucket, servicing the first I/O operation by performing first processing.

16. A non-transitory computer readable medium comprising code stored thereon that, when executed, performs a method of processing I/O (input/output) operations comprising:
   receiving a first I/O operation directed to a first storage resource, said first storage resource being included in a storage resource hierarchy comprising a plurality of levels of storage resources, wherein a plurality of buckets denote current amounts of tokens available for consumption in connection with servicing I/O operations, each of the plurality of buckets denoting a current amount of available tokens for a corresponding one of the storage resources included in the storage resource hierarchy; and
   determining, in accordance with the plurality of buckets of available tokens for the plurality of levels of storage resources, whether to service the first I/O operation, wherein a first bucket of the plurality of buckets denotes the current amount of available tokens for the first storage resource and a second bucket of the plurality of buckets denotes the current amount of available tokens for a second storage resource, wherein servicing the first I/O operation includes consuming a first amount of available tokens of the first bucket and a second amount of available tokens of the second bucket, wherein determining whether to service the first I/O operation includes:

determining, in accordance with the first amount and the second amount, whether the current amount of available tokens in at least one of the first bucket and the second bucket is insufficient to service the first I/O operation and whether there is at least one available token in each of the first bucket and the second bucket; and responsive to determining that the current amount of available tokens in at least one of the first bucket and the second bucket is insufficient to service the first I/O operation, and determining that there is at least one available token in each of the first bucket and the second bucket, servicing the first I/O operation by performing first processing.

* * * * *